United States Patent
Kim et al.

(10) Patent No.: US 10,804,728 B2
(45) Date of Patent: Oct. 13, 2020

(54) DEVICE FOR ADJUSTING PATH OF POWER AND METHOD FOR OPERATING THE SAME

(71) Applicant: Samsung Electronics Co., Ltd., Gyeonggi-do (KR)

(72) Inventors: Dong Zo Kim, Gyeonggi-do (KR); Se Hyun Cho, Gyeonggi-do (KR); Min Cheol Ha, Gyeonggi-do (KR); Yong Sang Yun, Gyeonggi-do (KR); Kwang Seob Kim, Gyeonggi-do (KR); Ji Won Kim, Gyeonggi-do (KR); Hye Won Kim, Seoul (KR); Chang Hak O, Gyeonggi-do (KR); Kyung Woo Lim, Gyeonggi-do (KR); Byeong Hyun Jang, Gyeonggi-do (KR); Kuk Hwan Jung, Gyeonggi-do (KR); Hyung Koo Chung, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 16/189,824

(22) Filed: Nov. 13, 2018

(65) Prior Publication Data
US 2019/0148968 A1 May 16, 2019

(30) Foreign Application Priority Data
Nov. 13, 2017 (KR) .................. 10-2017-0150480

(51) Int. Cl.
*H02J 7/00* (2006.01)
*H02J 7/02* (2016.01)
(Continued)

(52) U.S. Cl.
CPC .............. *H02J 7/025* (2013.01); *H02J 50/12* (2016.02); *H02J 50/80* (2016.02); *H04B 5/0037* (2013.01); *H04B 5/0056* (2013.01); *H04W 4/80* (2018.02)

(58) Field of Classification Search
CPC ....................................................... H02J 7/025
(Continued)

(56) References Cited

U.S. PATENT DOCUMENTS

| | | | |
|---|---|---|---|
| 2012/0280648 A1* | 11/2012 | Hwang | H02J 7/0013 320/108 |
| 2014/0195826 A1 | 7/2014 | Wojcik et al. | |
| 2017/0047784 A1* | 2/2017 | Jung | H02J 50/12 |

FOREIGN PATENT DOCUMENTS

| KR | 1020170077587 | 7/2017 |
|---|---|---|
| KR | 20-2017-0000893 | 8/2017 |

(Continued)

OTHER PUBLICATIONS

International Search Report dated Feb. 12, 2019 issued in counterpart application No. PCT/KR2018/013731, 11 pages.

*Primary Examiner* — Edward Tso
*Assistant Examiner* — Ahmed H Omar
(74) *Attorney, Agent, or Firm* — The Farrell Law Firm, P.C.

(57) ABSTRACT

An electronic device includes a battery, a power regulator electrically connected with the battery and including an input terminal and an output terminal, a connector electrically connected with the input terminal, a wireless power transmitting circuit electrically connected with the output terminal, a switch electrically connected between the connector and the wireless power transmitting circuit, and a controller configured to identify an approaching external electronic device or a wireless charging-related request, identify whether power is provided from an external power
(Continued)

supply via the connector in response to the identification, in response to identifying that power is not provided from the external power supply, supply power from the battery via the power regulator to the wireless power transmitting circuit, and in response to identifying that power is provided from the external power supply, supply the power provided from the external power supply to the wireless power transmitting circuit via the switch.

19 Claims, 29 Drawing Sheets

(51) Int. Cl.
*H02J 50/12* (2016.01)
*H04B 5/00* (2006.01)
*H02J 50/80* (2016.01)
*H04W 4/80* (2018.01)

(58) Field of Classification Search
USPC .......................................................... 320/108
See application file for complete search history.

(56) References Cited

FOREIGN PATENT DOCUMENTS

| KR | 20170093549 | * | 8/2017 | ................ H02J 7/00 |
|---|---|---|---|---|
| KR | 1020170093549 | | 8/2017 | |
| KR | 10-1777098 | | 9/2017 | |

* cited by examiner

DEVICE FOR ADJUSTING PATH OF POWER AND METHOD FOR OPERATING THE SAME

CROSS-REFERENCE TO RELATED APPLICATION(S)

This application is based on and claims priority under 35 U.S.C. § 119 to Korean Patent Application No. 10-2017-0150480, filed on Nov. 13, 2017, in the Korean Intellectual Property Office, the disclosure of which is incorporated herein by reference.

BACKGROUND

1. Field

The present disclosure relates generally to devices and methods for adjusting the path of power.

2. Description of Related Art

Recently, smartphones and other portable electronic devices have become widely used. Portable devices, such as smartphones or personal digital assistants (PDAs), are driven by rechargeable batteries.

An electronic device may have a connector for receiving power. When the connector of the electronic device is connected to an adaptor, the electronic device may receive power from the adaptor through the connector. The battery of the electronic device may be charged with the power received through the connector. The electronic device may drive its various inner hardware components using the received power. The electronic device may include a coil to convert a magnetic field into current or may wirelessly receive power to charge its battery.

Portable electronic devices have a limited battery size and charging capacity because they are made to be compact and lightweight for enhanced portability. Portable electronic devices may execute various programs and receive the power necessary to do so from their battery. The battery may be discharged by supplying power. The user may connect the connector of the portable electronic device to the adaptor to charge the battery. The portable electronic device may charge the battery with power from the adaptor. Charging the battery of the portable electronic device through the adaptor may limit the movement of the portable electronic device; thus it may be desirable to further develop portable battery packs. Battery packs are also made compact for portability while still being able to efficiently feed power to electronic devices.

It may be advantageous to provide a battery pack and method for operating the same by controlling the on/off states of various inner switches according to a plurality of conditions, (e.g., whether the battery pack is connected to an electronic device or an external electronic device, such as a casing, or whether the battery pack is connected to the connector), thereby adjusting the power supply route in various ways.

SUMMARY

The present disclosure has been made to address the above-mentioned problems and disadvantages, and to provide at least the advantages described below.

In accordance with an aspect of the present disclosure, an electronic device includes a battery, a power regulator electrically connected with the battery and including an input terminal and an output terminal, a connector electrically connected with the input terminal, a wireless power transmitting circuit electrically connected with the output terminal, a switch electrically connected between the connector and the wireless power transmitting circuit, and a controller configured to identify an approaching external electronic device or a wireless charging-related request, identify whether power is provided from an external power supply via the connector in response to the identification, in response to identifying that the power is not provided from the external power supply, supply power from the battery through the power regulator to the wireless power transmitting circuit, and in response to identifying that power is provided from the external power supply, supply the power through the switch to the wireless power transmitting circuit.

In accordance with another aspect of the present disclosure, an electronic device includes a battery, a power regulator electrically connected with the battery and including an input terminal and an output terminal, a connector, a wireless power transmitting circuit, a first switch configured to selectively and electrically connect an output terminal of the power regulator with the wireless power transmitting circuit, a second switch configured to selectively and electrically connect the wireless power transmitting circuit with the connector, and a controller configured to identify whether a wireless charging starting event is detected, and identify whether an external power supply is connected and control an on/off state of each of the first switch and the second switch based on whether the wireless charging starting event is detected and whether the external power supply is connected.

In accordance with another aspect of the present disclosure, an electronic device includes a short-range communication circuit, a wireless power receiving circuit, a battery, and a processor electrically connected with the short-range communication circuit and the wireless power receiving circuit, the processor configured to identify, through the short-range communication circuit, whether a case including a coupling unit physically capable of being coupled with an external battery pack is mounted on the electronic device, when the case is mounted on the electronic device, output a wireless charging-related signal through the wireless power receiving circuit and monitor for a response to the signal, when there is no response to the signal, receive power from the external battery pack via the wireless power receiving circuit in a first wireless charging scheme and charge the battery, and when there is a response to the signal, receive the power from the external battery pack via the wireless power receiving circuit in a second wireless charging scheme and charge the battery.

In accordance with another aspect of the present disclosure, an electronic device includes a near-field communication (NFC) circuit, a processor electrically connected with the NFC circuit, and a wireless power receiving circuit, wherein the processor is configured to receive information from a case containing the electronic device through the NFC circuit, in response to the received information satisfying a designated condition, identify that authentication of the case succeeds, in response to identifying that the authentication of the case succeeds, and upon receiving a signal associated with initiating wireless charging from a battery pack coupled with the case through the wireless power receiving circuit, determine to perform quick wireless charging, and in response to determining to perform quick wireless charging, send a quick wireless charging request through the wireless power receiving circuit to the battery pack.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
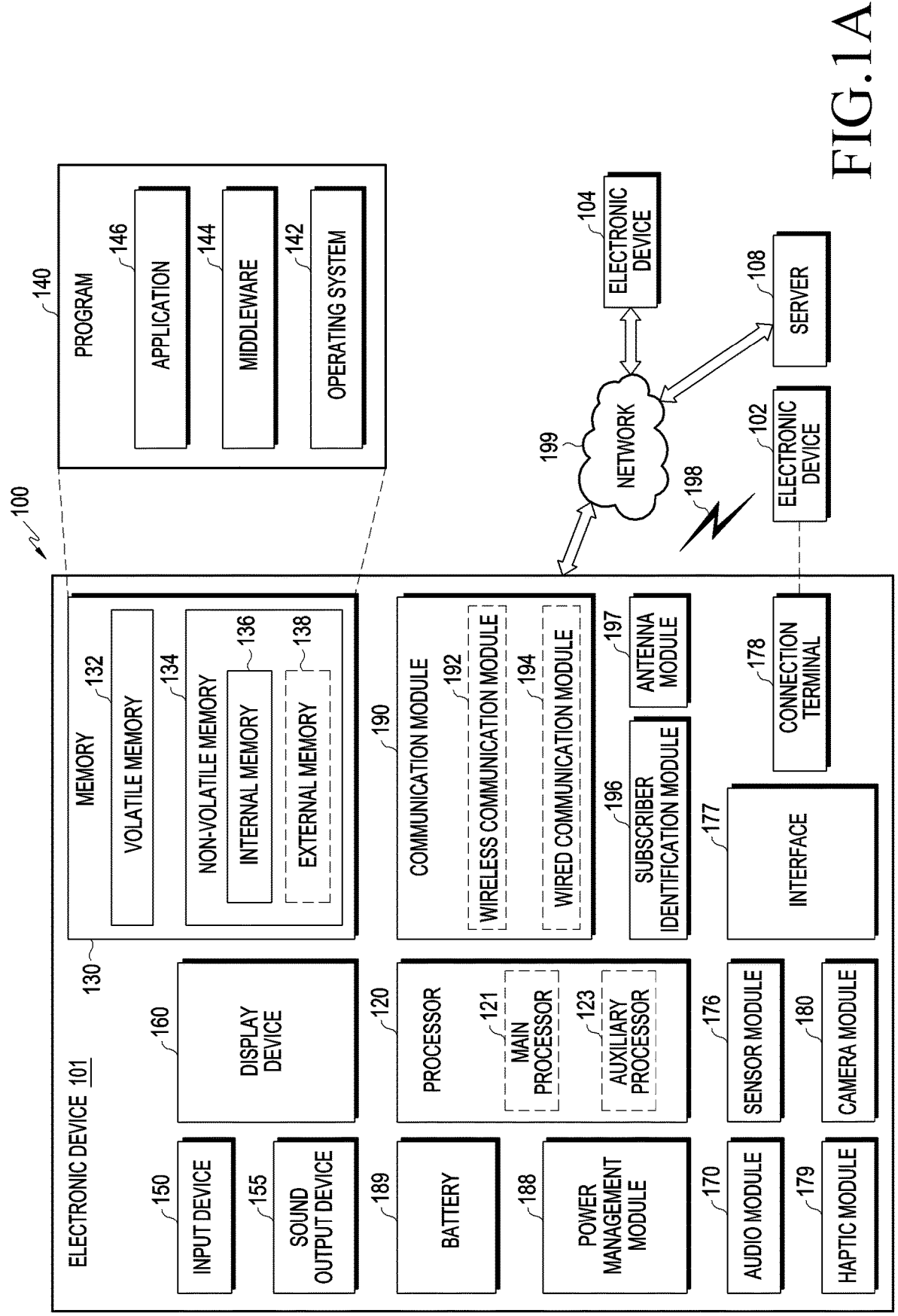
FIG. 1A is a block diagram illustrating an electronic device in a network environment to, according to an embodiment.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, singular terms such as "a," "an," and "the" may include the plural forms thereof unless the context clearly indicates otherwise. Thus, for example, reference to "a component surface" may include reference to one or more of such surfaces.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1A is a block diagram illustrating an electronic device 101 in a network environment 100, according to an embodiment.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, the electronic device 101 may exclude at least one (e.g., the display device 160 or the camera module 180) of the components or add other components. In some embodiments, some components may be implemented to be integrated together. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display 160 may visually provide information to the outside (e.g., a user) of the electronic device 101. The display device 160 may include, for example, a display, a hologram device, or a projector and control circuitry to control a corresponding one of the display, the hologram device, or the projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or a flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a directed (e.g., wired) communication channel or a wireless communication channel between the electronic device 101 and an external electronic device (e.g., the electronic device 102, the electronic device 104, or the server 108) and performing communication through the established communication channel. The communication module 190 may include one or more CPs that are operated independently from the processor 120 (e.g., an AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, the wireless power receiving circuit may be implemented in a uni-body hardware component (e.g., in the same housing) that includes the coil and the rectifying or converting circuit. The electronic device 102 may be a case which houses the electronic device 101 or a battery pack that wirelessly or wiredly provides power to the electronic device 101.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

Figure 1B:
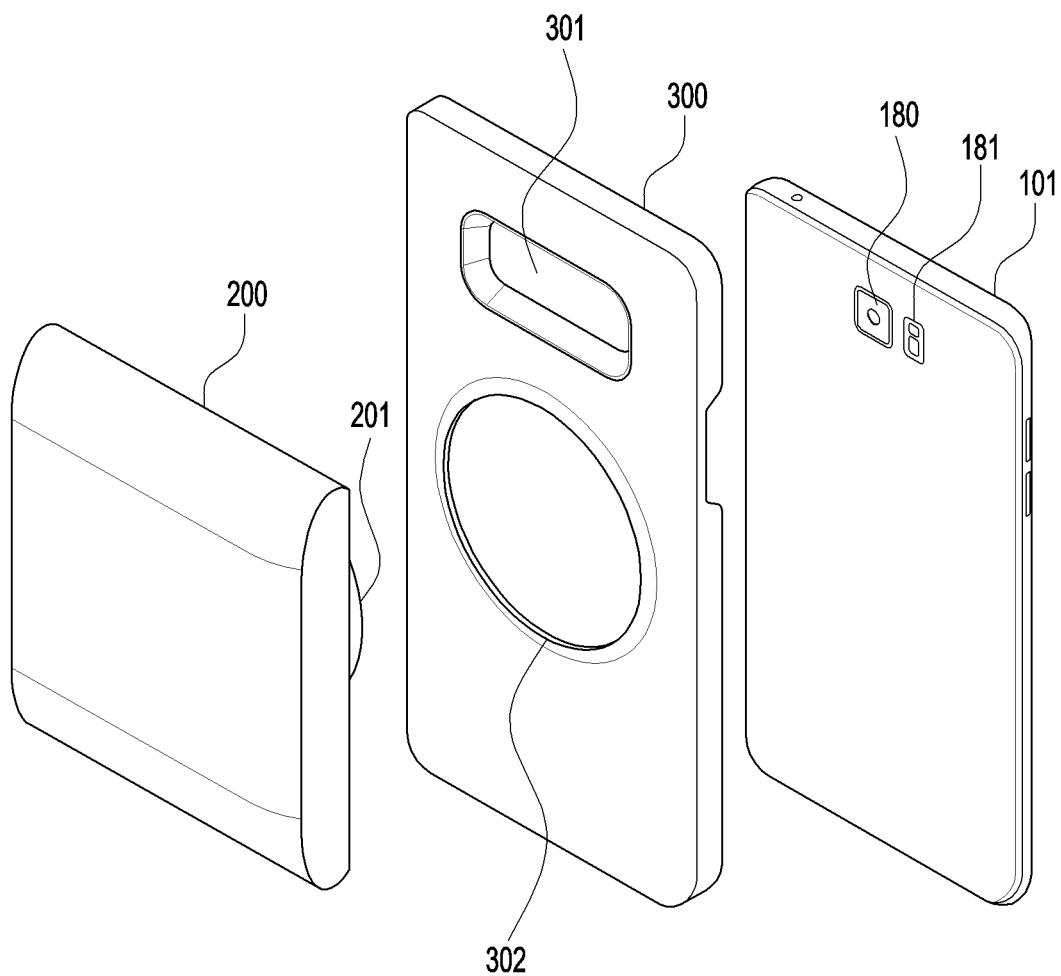
FIG. 1B is a view illustrating an electronic device, a battery pack, and a case, according to an embodiment.

FIG. 1B is a view illustrating an electronic device, a battery pack, and a case, according to an embodiment.

Referring to FIG. 1B, the electronic device 101 may be a smartphone. The electronic device 101 may include a camera module and a flash 181 at the back. The case 300 may include a seat to receive the electronic device 101. The seat of the case 300 may be sized and shaped to be essentially the same as the electronic device 101, allowing the electronic device 101 to be fit into the seat. The seat of the case 300 may be structured to allow the electronic device 101 to be fastened to the case 300.

The housing of the case 300 may be formed of a flexible material. While the housing is transformed by an external force, the electronic device 101 may be placed in the seat of the case 300, and when the external force is no longer applied, the housing may return to its original shape, allowing the electronic device 101 to be fastened to the case 300.

The case 300 may have an opening 301. Where the electronic device 101 is placed in the case 300, the camera module 180 and the flash 181 may be exposed through the opening 301. The case 300 may have a coupling structure 302 for coupling with the battery 200. The coupling structure 302 may have a circular wall projecting from the rear surface of the case 300. A recess may be formed in the inside of the circular wall of the coupling structure 302.

The battery pack 200 may have a coupling structure 201 for coupling with the case 300. The coupling structure 201 may project from one surface of the battery pack 200, allowing it to couple with the recess-formed coupling structure 302 of the case 300. The battery pack 200 may have a battery inside the housing and the battery pack 200 may wirelessly or wiredly charge an external electronic device (e.g., the electronic device 101) using the battery. For example, the battery pack 200 may wirelessly transmit power to the external electronic device (e.g., the electronic device 101). The battery pack 200 may produce a magnetic field using its coil. An AC current may flow along the coil, thus making it possible to create a magnetic field with an amplitude which varies over time. An AC induced electromagnetic force may be produced through the secondary coil of a charging target (e.g., the electronic device 101).

The expressions "battery pack 200 performs a particular operation" or "electronic device 101 performs a particular operation", as used herein, may mean that the controller 254 of the battery pack 200, the processor 120 of the electronic device 101, or other hardware perform the particular operation. In other words, the expressions may mean that the controller 254 of the battery pack 200 or the processor 120 of the electronic device 101 controls other hardware to perform the particular operation. Further, the expressions may mean that the controller, the processor, or other hardware triggers the particular operation as an instruction for performing the particular operation, which is stored in a storage circuit (e.g., a memory) of the battery pack 200 or the electronic device 101, and is executed. The battery pack 200 may wiredly transmit power to the external electronic device. The battery pack 200 may receive power from an external power supply through the connector. The battery pack 200 may charge its internal battery or an external electronic device (e.g., the electronic device 101) using power received from the outside. The battery pack 200 may adjust the power supplying route by controlling the on/off state of at least one internal switch based on at least one of the following conditions: whether it is connected to the external power supply, whether it is connected to the electronic device requesting a charge, or whether a wireless charge initiating event (e.g., approaching the case 300 or the electronic device 101, or receiving a wireless charge request) is detected. Adjusting the power supplying route of the battery pack 200 is described below in greater detail.

Figure 1C:
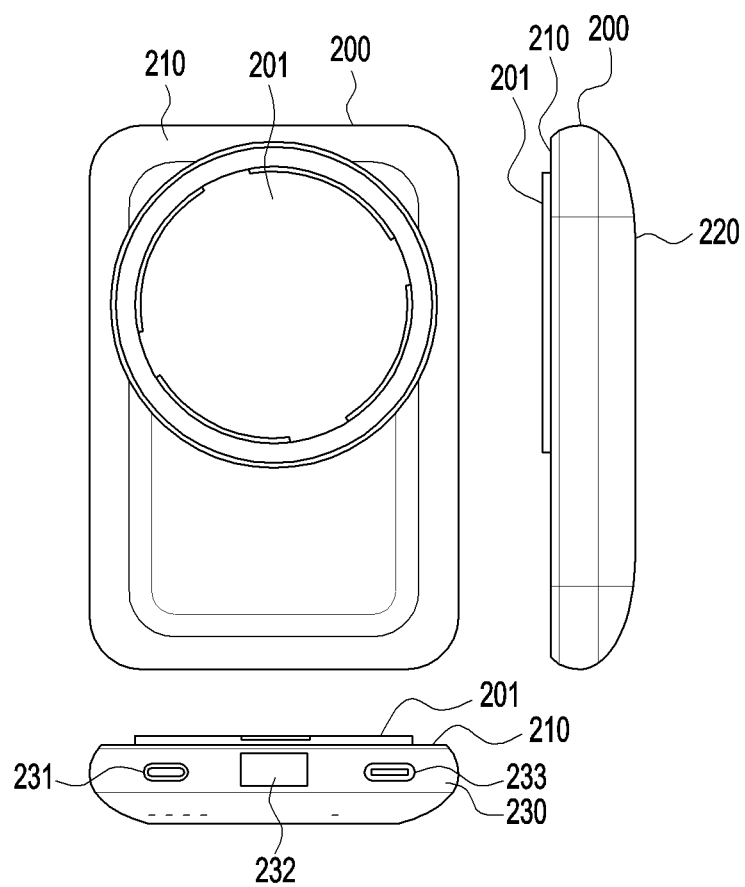
FIG. 1C illustrates a plan view and side views of a battery pack, according to an embodiment.

FIG. 1C illustrates a plan view and side views of a battery pack, according to an embodiment.

Referring to FIG. 1C, a coupling means 201 may be disposed on the first surface 210 of the housing of the battery pack 200. The coupling means 201 may be structured to project from the first surface 210 of the housing at a particular height (H). A second surface 220 of the housing may face in the opposite direction of the first surface 220. A first side surface 230 of the housing may be a side surface able to connect the first surface 210 with the second surface 220. An output connector 232 and an input connector 233 may be formed on the first side surface 230. At least one of the output connector 232 or the input connector 233 may follow, but is not limited to, various standards defined for USB, such as USB type-A, USB type-B, USB type-B super speed, USB-micro type, or USB type-C.

Although in the example shown in FIG. 1C, the battery pack 200 includes the output connector 232 and the input connector 233 separately, the battery pack 200 may alternatively include only one connector that may be used for input and output. For example, when the external power supply connects to the connector, the battery pack 200 may receive power from the external power supply through the connector. When the external electronic device to be charged connects to the connector, the battery pack 200 may deliver power from the internal battery through the connector to the external electronic device. Either receiving power from the outside or supplying power to the outside may be performed where there is one connector.

Where the output connector 232 and the input connector 233 are implemented, each connector may not necessarily be limited to playing a fixed role. For example, although the external power supply connects to the output connector 232, the battery pack 200 may also receive power from the external power supply through the output connector 232. The external electronic device may wiredly be charged by connecting to the output connector 232. When the external electronic device is connected to the output connector 232, the battery pack 200 may provide power from the internal battery through the output connector 232. The battery pack 200 may also provide power from the external power supply through the output connector 232. The external power supply (e.g., a receptacle or an adaptor) may wiredly connect to the input connector 233. The battery pack 200 may charge the battery inside the housing using the power received from the external power supply through the input connector 233. The battery pack 200 may provide power, which is received from the external power supply through the input connector 233, to the external electronic device through the output connector 232. The battery pack 200 may wirelessly transmit power, which is received from the external power supply through the input connector 233, to the outside through the wireless power transmitting circuit. A power key 231 may be disposed on the first side surface 230. Upon detecting a press of the power key 231, the battery pack 200 may be turned on or off.

Figure 1D:
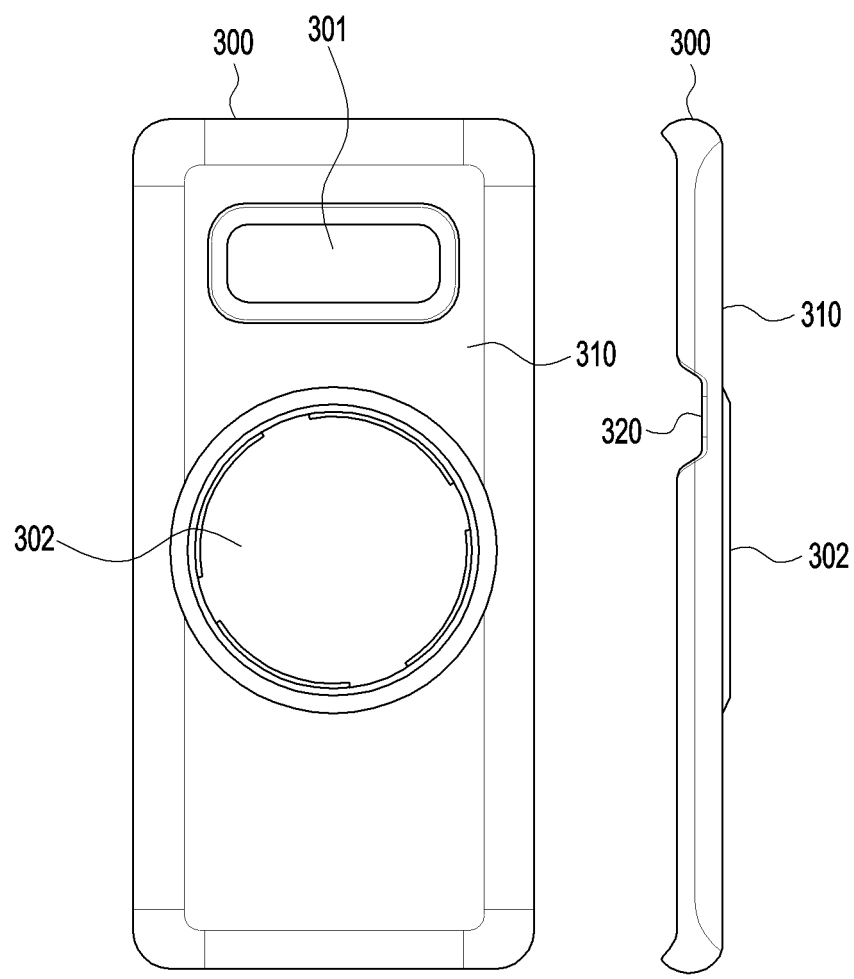
FIG. 1D illustrates a plan view and side views of a case, according to an embodiment.
Figure 1E:
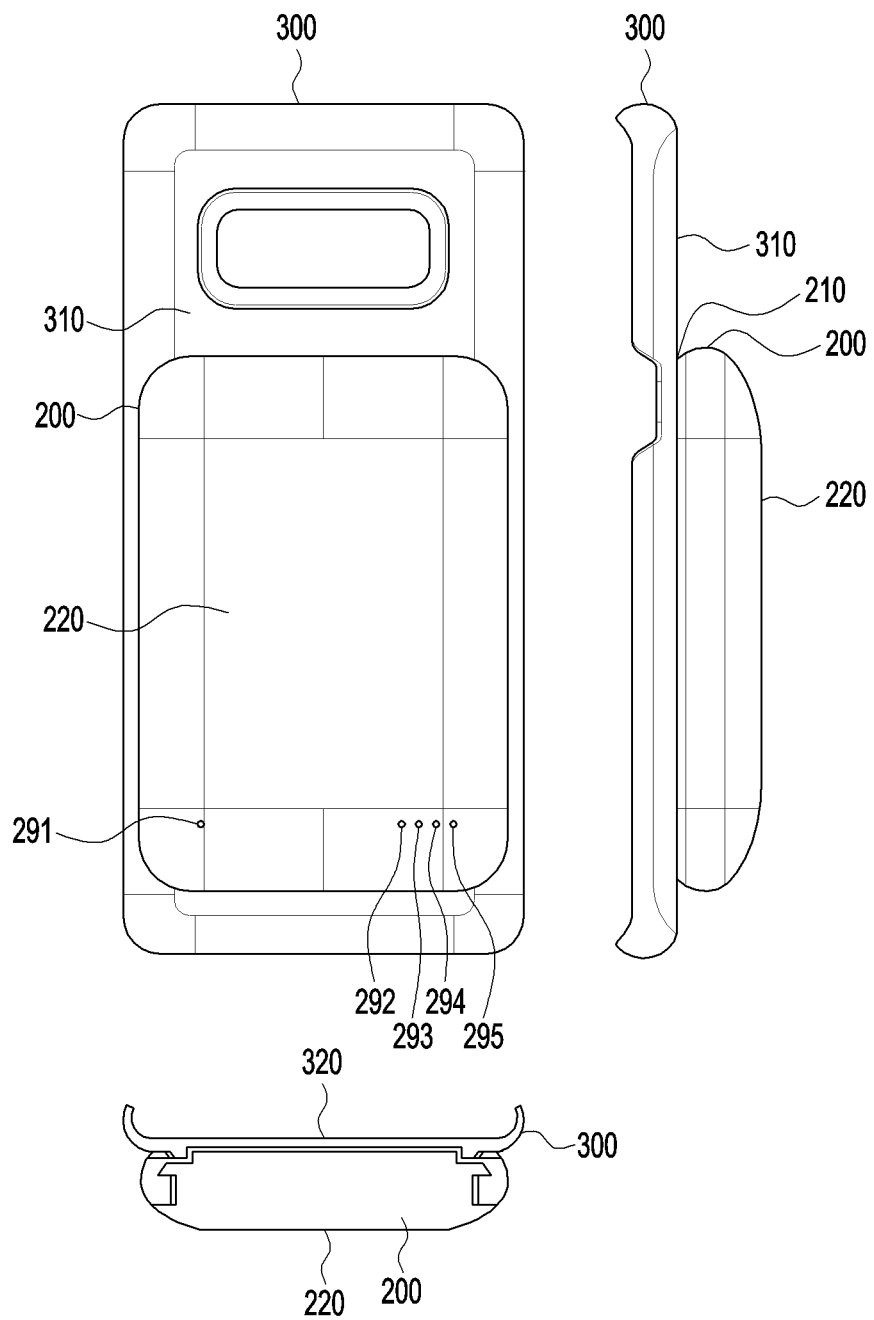
FIG. 1E illustrates a plan view and side views of a battery pack and a case, according to an embodiment.

FIG. 1D illustrates a plan view and side views of a case, according to an embodiment. FIG. 1E illustrates a plan view and side views of a battery pack and a case, according to an embodiment.

Referring to FIG. 1D, the coupling structure 302 may be disposed on the first surface 310 of the housing of the case 300. The coupling structure 302 may be structured so that its outer circumference projects from the first surface 310, with a depressed recess with respect to the outer circumference, as shown in FIG. 1D. The depth of the recess may be larger than the height H of the coupling structure 201 of the battery pack 200. As shown in FIG. 1E, the coupling structure 201 of the battery pack 200 may fit into the coupling structure 302 of the case 300. Where the coupling structure 201 of the battery pack 200 fits into the coupling structure 302 of the case 300, the first surface 310 of the case housing may make contact with the first surface 210 of the housing of the battery pack 200.

The coupling structure 201 may be positioned closer to the second surface 320 of the housing of the case 300 than to the first surface 210 of the housing, as shown in FIG. 1E. Thus, where the electronic device 101 is placed on the second surface 320 of the housing of the case 300, the coupling structure 201 may be disposed adjacent to the electronic device 101. The coupling structure 201 may have a coil for wireless charging embedded therein. Thus, the wireless charging coil may be positioned close to the electronic device 101, leading to increased wireless charging efficiency.

Referring to FIG. 1E, the battery pack 200 may include a wireless charging indicator 291 and power gauge indicators 292, 293, 294, and 295 arranged on the second surface 220 of the housing. The wireless charging indicator 291 may emit light in order to distinguish between wireless charging in progress and wireless charging not in progress. The power gauge indicators 292, 293, 294, and 295 may emit light to allow the user to see the remaining power of the internal battery of the battery pack 200. When the hardware key of the battery pack 200 is pressed, the battery pack 200 may accordingly control the wireless charging indicator 291 and the power gauge indicators 292, 293, 294, and 295 to emit light.

Figure 2A:
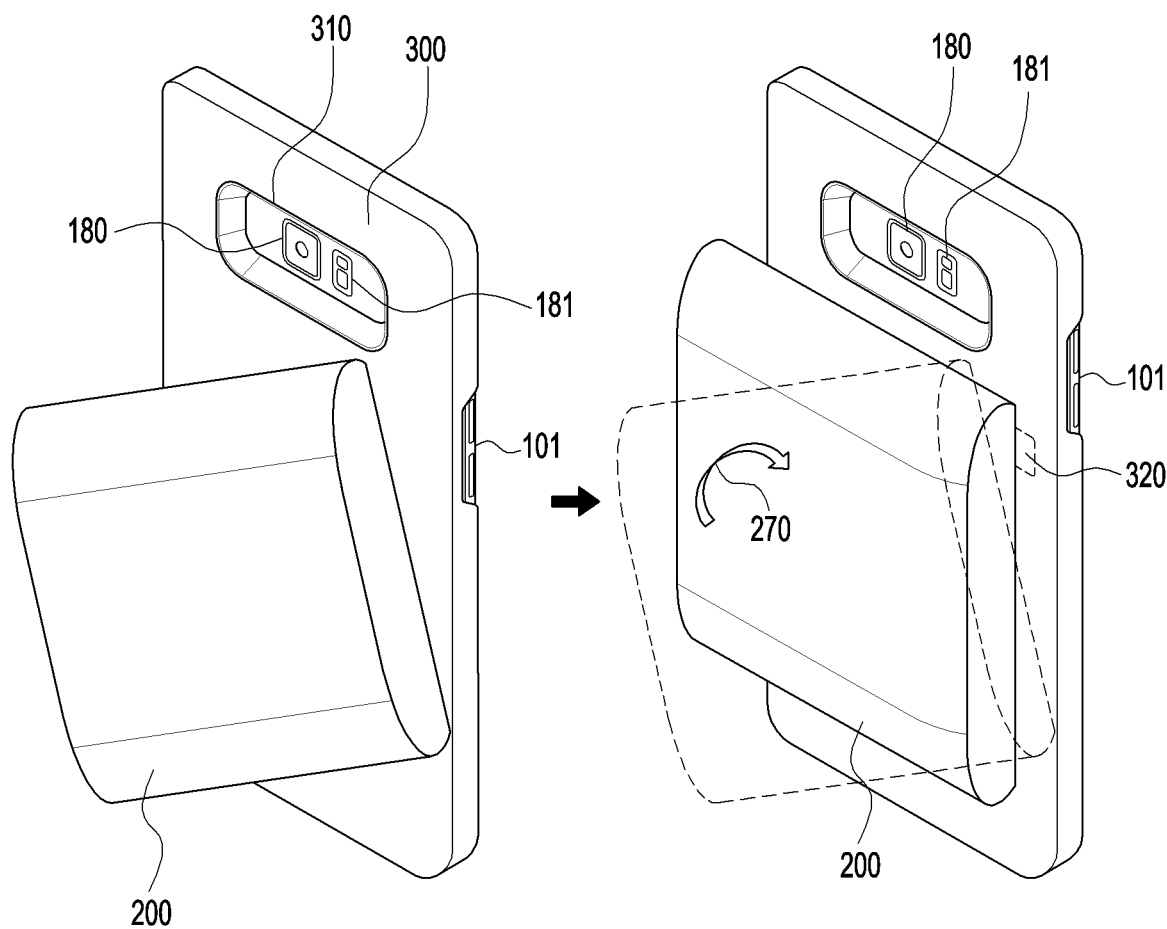
FIG. 2A illustrates a process for coupling a battery pack, according to an embodiment.

FIG. 2A illustrates a process for coupling a battery pack, according to an embodiment.

Referring to FIG. 2A, the coupling structure 201 of the battery pack 200 may be inserted into the coupling structure 302 of the case 300. The coupling structure 201 of the battery pack 200 may be shaped so that it may be inserted into the coupling structure 302 of the case 300 when the battery pack 200 and the case 300 are not aligned with each other as shown in FIG. 2A. After the coupling structure 201 of the battery pack 200 is inserted into the coupling structure 302 of the case 300, the user may rotate 270 the battery pack 200. Through this rotation 270, the battery pack 200 may be substantially aligned with the case 300 as shown in FIG. 2A.

Where the battery pack 200 and the case 300 are substantially aligned with each other, the coupling structure 201 of the battery pack 200 may further include a fixing means that may be fixed to the case 300. For example, the battery pack 200 and the case 300 may include a first magnet and a second magnet, respectively. When the battery pack 200 is rotated to be substantially aligned with the case 300, the battery pack 200 may be fastened to the case 300 by the attractive force of the first and second magnet. The first and second magnet may be positioned in the battery pack 200 and the case 300, respectively, along directions of opposite polarities when aligned. Alternatively, the battery pack 200 and the case 300 may have physical structures that may be fastened to each other after being rotated. In this case, where the battery pack 200 and the case 300 are not substantially aligned with each other as shown on the left side of FIG. 2A, the battery pack 200 may be freely pulled out of the case 300. Where the battery pack 200 and the case 300 are substantially aligned with each other, as shown on the right side of FIG. 2A, the battery pack 200 may be fastened to the case 300.

A mounting detection member may be positioned on the second surface 320 of the case 300. The sensor of the battery pack 200 may detect the position of the mounting detection member. The battery pack 200 may determine that the battery pack 200 is connected to the case 300 based on the detection of the mount detector. The battery pack 200 may start wireless charging when a connection between the battery pack 200 and the case 300 is detected. For example, upon the detection of the mounting detection member, upon the detection of connection to the case 300, or upon the detection the approaching of the case 300 or electronic device 101 may be events which initiate wireless charging. As the battery pack 200 initiates wireless charging, the electronic device 101 received in the case 300 may wirelessly receive power. The mounting detection member may be a magnet. As a hall sensor of the battery pack 200 senses a magnetic field produced by the magnet, the battery pack 200 may determine whether it is connected to the case 300. The mounting detection member may be an NFC tag. As a hall sensor of the battery pack 200 senses a magnetic field produced by the magnet, the battery pack 200 may determine whether it is connected to the case 300. The mounting detection member may be implemented as a terminal connected to the ground. The battery pack 200 may include a terminal connected to the terminal of the mounting detection member when the battery pack 200 and the case 300 are coupled together. As the voltage or current applied to the terminal varies in magnitude, the battery pack 200 may determine whether the battery pack 200 is connected to the case 300.

Figure 2B:
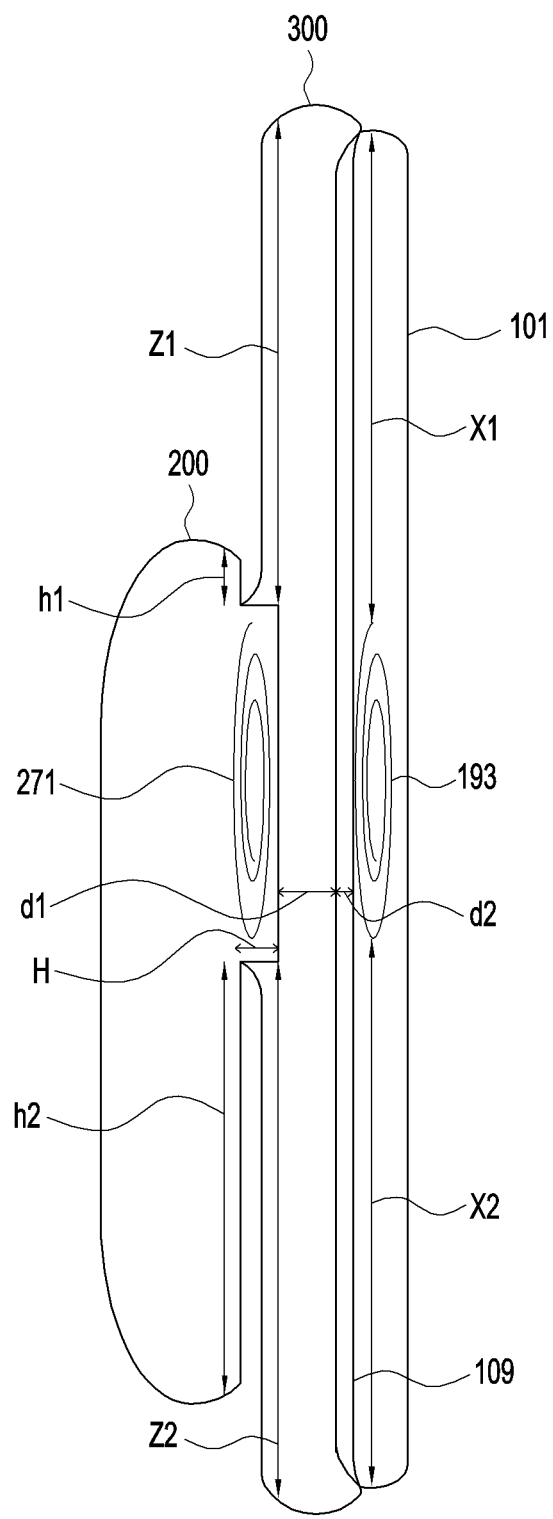
FIG. 2B is a view illustrating a state of a battery pack being coupled, according to an embodiment.

FIG. 2B is a view illustrating the state of a battery pack being coupled, according to an embodiment.

Referring to FIG. 2B, the electronic device 101 may be received in the case 300. The second surface of the housing of the case 300 may contact a rear housing 109 of the electronic device 101. The rear housing 109 may have a thickness d2. As set forth above, the coupling structure 201 of the battery pack 200 may be shaped to project from the first surface 210 of the battery pack 200, and the coil 271 for wireless charging may be positioned in the coupling structure 201. The coupling structure 201 may be inserted into the recess-formed coupling structure 302 of the case 300. Where the coupling structure 201 is inserted into the coupling structure 302 of the case 300, the distance between the coupling structure 201 and the rear housing 109 of the electronic device 101 may be d1. The distance d1 may also correspond to the thickness of the case 300. In a section of the coupling structure 302 of the case 300, the thickness between the first surface 310 and the second surface 320 may also be equivalent to d1, the distance between the coupling structure 201 and the rear housing 109 of the electronic device 101. The position of the coupling structure 201 may be a distance h1 lower than the top of the battery pack 200 and be a distance h2 higher than the bottom of the battery pack 200. The coil 193 of the electronic device 101 may be aligned with the coil 271 of the battery pack 200. The position of the coil 193 may be a distance X1 lower than the top of the electronic device 101 and a distance X2 higher than the bottom of the electronic device 101. The position of the coupling structure 302 of the case 300 may be determined according to the position of the coil 193 of the electronic device 101. The coupling structure 302 may be a distance Z1 lower than the top of the case 300 and a distance Z2 higher than the bottom of the case 300. The position of the coupling structure 302 may be determined according to the position of the coil 193 of the electronic device 101. The distance between the coil 271 of the battery pack 200 and the coil 193 of the electronic device 101 may be the sum of the thickness d1 of the case 300 and the thickness d2 of the rear housing 109 of the electronic device 101. As the distance between the two coils 193 and 271 is reduced by the projecting coupling structure 201 of the battery pack 200 and the recessed coupling structure 302 of the case 300, the wireless charging efficiency may improve.

The case 300 may have an opening instead of the coupling structure 302. In this case, d1 may be 0, and the coupling structure 201 of the battery pack 200 may come in contact with the rear housing 109 of the electronic device 101 such that the distance between the coupling structure 201 and the rear housing 109 is d2. This embodiment is described below in greater detail with reference to FIGS. 16A and 16B.

Figure 3A:
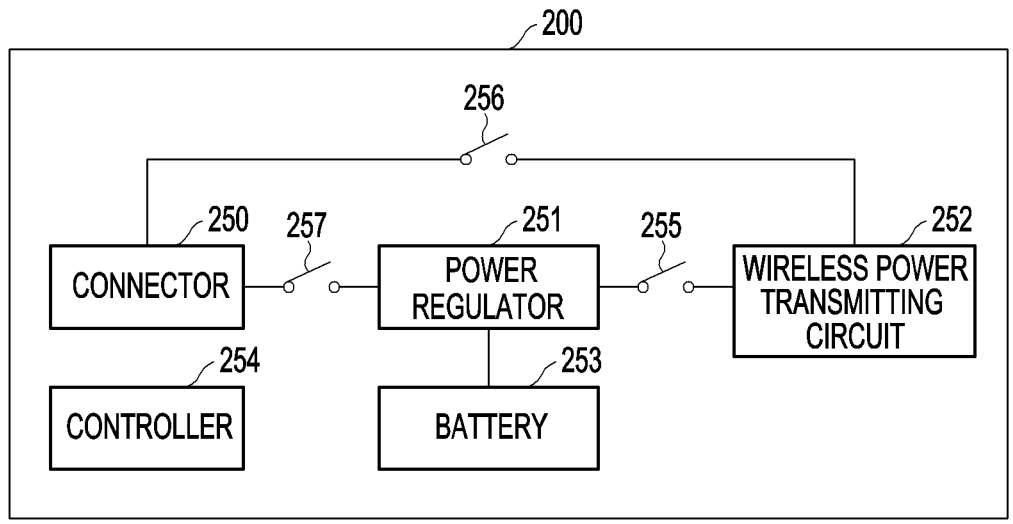
FIGS. 3A and 3B are block diagrams illustrating a battery pack for adjusting the power supplying route, according to an embodiment.

FIG. 3A is a block diagram illustrating a battery pack, according to an embodiment.

Referring to FIG. 3A, the battery pack 200 may include a connector 250, a power regulator 251, a wireless power transmitting circuit 252, a battery 253, a controller 254, and at least one or more switches 255, 256, and 257. The first switch 255 may selectively and electrically connect the output terminal of the power regulator 251 with the wireless power transmitting circuit 252. The third switch 257 may selectively and electrically connect the connector 250 with the input terminal of the power regulator 251. The second switch 256 may selectively and electrically connect the connector 250 with the wireless power transmitting circuit 252.

An external power supply may be connected to the connector 250. An external electronic device that is requesting charge may be connected with the connector 250. The connector 250 may follow, but is not limited to, various standards defined for USBs, for example, USB type-A, USB type-B, USB type-B super speed, USB-micro type, or USB type-C. Where an external power supply is connected with the connector 250, power from the external power supply may be delivered to either the power regulator 251 or the wireless power transmitting circuit 252 of the battery pack 200 through the connector 250. For example, when the second switch 256 is in an on state and the third switch 257 is in an off state, the power from the external power supply may be transferred through the connector 250 to the wireless power transmitting circuit 252. For example, when the second switch 256 is in an off state and the third switch 257 is in an on state, the power from the external power supply may be transferred through the connector 250 to the power regulator 251. When the second switch 256 is in an on state and the third switch 257 is in an on state, the power from the external power supply may be transferred through the connector 250 to the power regulator 251 and the wireless power transmitting circuit 252. The on/off state of the second switch 256 and the third switch 257 may be controlled by the controller 254 according to the current state of the battery pack 200.

The on/off state of the second switch 256 may be varied even without control by the controller 254. For example, the second switch 256 may be implemented as a metal oxide semiconductor field effect transistor (MOSFET). In this case, the on/off state of the second switch 256 may be determined according to the voltage applied to the gate of the second switch 256. For example, a branched path connected to the connector 250 may be connected to the gate of the second switch 256. The branched path may be branched from the conducting line connecting the connector 250 to the second switch 256 directly or via a coupler, for example. Where the external power supply is connected to the connector 250, a voltage equal or higher than the threshold voltage of the second switch 256 is applied so that the second switch 256 may switch into an on state. Accordingly, power from the external power supply may be transferred through the second switch 256 to the wireless power transmitting circuit 252. Other switches (e.g., 255 or 257) may turn on or off based on the voltage applied to the gates, even without a control signal.

The controller 254 may control the on/off state of at least one switch 255, 256, or 257 according to the state of the battery pack 200. The controller 254 may control the on/off state of at least one switch 255, 256, or 257 based on at least one of the following conditions: whether the external power supply is connected to the connector 250, whether the external electronic device is connected to the connector 250, or whether an event which initiates wireless charging is detected.

Where the external power supply is determined to be connected to the connector 250 and the wireless charging initialization event is detected, the battery pack 200 may control the second switch 256 to turn on and control the first switch 255 to turn off. Accordingly, power from the external power supply may be immediately transferred through the connector 250 to the wireless power transmitting circuit 252.

The battery pack 200 may control the second switch 256 to turn on, the first switch 255 to turn off, and the third switch 257 to turn on. In this case, the battery pack 200 may use the power from the external power supply for the purposes of wireless charging and charging the battery 253.

The battery pack 200 may control the second switch 256 to turn on, the first switch 255 to turn off, and the third switch 257 to turn off. In this case, the battery pack 200 may use the power from the external power supply solely for wireless charging.

The wireless power transmitting circuit 252 may produce a magnetic field using the power from the external power supply. The wireless power transmitting circuit 252 may wirelessly transmit power according to various charging schemes. In the case of an induction scheme, the wireless power transmitting circuit 252 may perform communication with an in-band communication scheme, and in the case of a resonance scheme, the wireless power transmitting circuit 252 may perform communication with an out-band communication scheme. The wireless power transmitting circuit 252 may include either a circuit for in-band communication or a circuit for out-band communication. The circuit for in-band communication may modulate and demodulate signals using either the current, voltage, or power frequency of the signal applied to the coil or using the impedance of the in-band communication circuit. The circuit for out-band communication may include a communication module according to a short-range communication scheme (e.g., Bluetooth™ low energy (BLE)).

The in-band communication circuit and the out-band communication circuit may be implemented as a single hardware component. For example, the wireless power transmitting circuit 252 may transmit power in an induction scheme. The wireless power transmitting circuit 252 may be implemented in a scheme defined by wireless power consortium (WPC) standards (or Qi standards). Adopting the induction scheme, the wireless power transmitting circuit 252 may include a power source, a direct current (DC)-AC converting circuit, an amplifying circuit, an impedance matching circuit, at least one capacitor, at least one coil, or a communication and computation circuit. The communication and computation circuit of the wireless power transmitting circuit 252 may perform various standard defined detection procedures such as a ping procedure, a subscription procedure, a procedure for controlling the wireless power receiving device, and a procedure for adjusting the magnitude of the current applied to the coil.

Furthermore, the communication and computation circuit may determine information to be delivered by the wireless power receiving device based on, at least, a variation in at least one of the voltage, current, or load (e.g., impedance) applied to the coil. The wireless power receiving device (e.g., the electronic device 101) may perform on/off keying modulation to turn the switch connected to a dummy load (e.g., a dummy resistor or dummy capacitor) on or off, as per an in-band scheme based on binary data to be transferred. The communication and computation circuit may determine the binary data to be transferred by the wireless power receiving device 101 by demodulating the variation information detected.

The communication and computation circuit of the wireless power transmitting circuit 252 may be implemented integrally with, or as a separate hardware component from, the controller 254 of the battery pack 200. The controller 254 or the communication and computation circuit may be implemented in various circuits capable of performing calculation, such as a CPU or other general-purpose processors, a mini-computer, a microprocessor, a micro controlling unit (MCU), or a field programmable gate array (FPGA), but not limited in type thereto.

At least one capacitor together with at least one coil may constitute a resonance circuit. For example, the wireless power transmitting circuit 252 may transmit power in a resonance scheme. Adopting the resonance scheme, the wireless power transmitting circuit 252 may include a power source, a DC-AC converting circuit, an amplifying circuit, an impedance matching circuit, at least one capacitor, at least one coil, and a computation and out-band communication circuit. The at least one capacitor and the at least one coil may constitute a resonance circuit. The wireless power transmitting circuit 252 may be implemented in a scheme defined by the Alliance for Wireless Power (A4WP) standards or Air Fuel Alliance (AFA) standards. Also, in this case, the computation and out-band communication circuit of the wireless power transmitting circuit 252 and the controller may be implemented in a single hardware component or in different hardware components. The computation and out-band communication circuit may perform detection or subscription of the wireless power receiving device and adjustment of the magnitude of current applied to the coil. The computation and out-band communication circuit may communicate with the wireless power receiving device using a BLE communication scheme.

The wireless power transmitting circuit 252 may include a coil that is capable of producing a magnetic field when letting an electric current flow across it through a resonance or induction scheme. The process by which the wireless power transmitting circuit 252 produces an induced magnetic field may be interpreted as the wireless power transmitting circuit 252 wirelessly transmitting power. Furthermore, the electronic device 101 may include a coil that produces an induced electromagnetic force from the ambient magnetic field. The process of the electronic device 101 producing an induced electromotive force through the coil may be interpreted as the electronic device 101 wirelessly receiving power.

Where the external power supply is determined to not be connected to the connector 250 and the wireless charging initialization event is detected, the battery pack 200 may control the first switch 255 to turn on, the second switch 256 to turn off, and the third switch 257 to turn off. Accordingly, power from the battery 253 may be delivered through the power regulator 251 to the wireless power transmitting circuit 252. The power regulator 251 may boost-convert or buck-convert the voltage of the received power. The power regulator 251 may increase the voltage of the power by boost-converting power from the battery 253 and may transfer the power to the wireless power transmitting circuit 252. The wireless power transmitting circuit 252 may wirelessly transmit power using the power from the battery 253. Alternatively, the battery pack 200 may control the second switch 256 to turn on, and the wireless power transmitting circuit 252 may determine whether or not there is another electronic device to wirelessly charge by sending out ping signals and monitoring for a response. When another electronic device is discovered, the wireless power transmitting circuit 252 may proceed with the power transmission operation, and when no other electronic devices are discovered, the wireless power transmitting circuit 252 may be deactivated.

When the external power supply is determined to be connected to the connector 250 and the wireless charging initialization event is not detected, the battery pack 200 may control the first switch 255 to turn off and control the third switch 257 to turn on. Accordingly, power from the external power supply may be transferred through the connector 250 to the power regulator 251. The power regulator 251 may adjust the magnitude of at least one of the voltage or current of the received power and may charge the battery 253. The power regulator 251 may adjust at least one of the voltage or current of the received power in various charging modes, for example, a constant current mode or a constant voltage mode, and may deliver the adjusted power to the battery 253.

The battery pack 200 may control the first switch 255 to turn off, control the third switch 257 to turn on, and control the second switch 256 to turn off. While the second switch 256 is turned off, no power is delivered to the wireless power transmitting circuit 252, and all power from the external power supply is delivered to the battery 253, enabling quick charging. Alternatively, the battery pack 200 may control the first switch 255 to turn off, control the third switch 257 to turn on, and control the second switch 256 to turn on. While the second switch 256 is turned on, power may be delivered to the wireless power transmitting circuit 252, and the wireless power transmitting circuit 252 may perform a ping phase procedure using the delivered power and monitor for a response. When the wireless power receiving device is detected during the ping phase, the wireless power transmitting circuit 252 may perform wireless charging, and unless the wireless power receiving device is detected, the wireless power transmitting circuit 252 may deactivate wireless charging.

When the external electronic device is determined to be connected to the connector 250 and the wireless charging initialization event is not detected, the battery pack 200 may control the first switch 255 to turn off and control the third switch 257 to turn on. Accordingly, power from the battery 253 may be delivered through the power regulator 251 and the connector 250 to the external electronic device. The external electronic device may be wiredly charged by the battery pack 200. The controller 254 may obtain information (e.g., at least one of the magnitude of rated power, the magnitude of rated voltage, or the magnitude of rated current) related to the charging of the external electronic device through the data line of the connector 250. The controller 254 may control the power regulator 251 to adjust the magnitude of at least one of the voltage or current of the power from the battery 253 based on, at least, the identified information.

The battery pack 200 may control the first switch 255 to turn off, control the third switch 257 to turn on, and control the second switch 256 to turn off. Alternatively, the battery pack 200 may control the first switch 255 to turn off, control the third switch 257 to turn on, and control the second switch 256 to turn on. For example, upon detecting a separate key input to request wireless charging, the battery pack 200 may control the second switch 256 to turn on, and the power regulator 251 may adjust the voltage of the power from the battery 253 to a preset voltage magnitude (e.g., 5V).

Where there is one connector 250 implemented, the battery pack 200 may determine whether the device connected to the connector 250 is the external power supply or the external electronic device requesting a charge by using the voltage applied to the connector 250. The battery pack 200 may determine whether the device connected with the connector 250 is the external power supply or the external electronic device requesting a charge based on, at least, the information (e.g., identification information) obtained through the data line communication of the connector 250.

The battery pack 200 may measure the magnitude of the voltage applied to at least one line of the connector 250 and may determine whether the connected device is the external power supply or the external electronic device requesting a charge based on the result of the measurement. The battery pack 200 may identify a variation in the state of the terminal of the connector 250 by the connection of the external electronic device and determine whether the connected device is the external power supply or the external electronic device requesting charge.

Figure 3B:
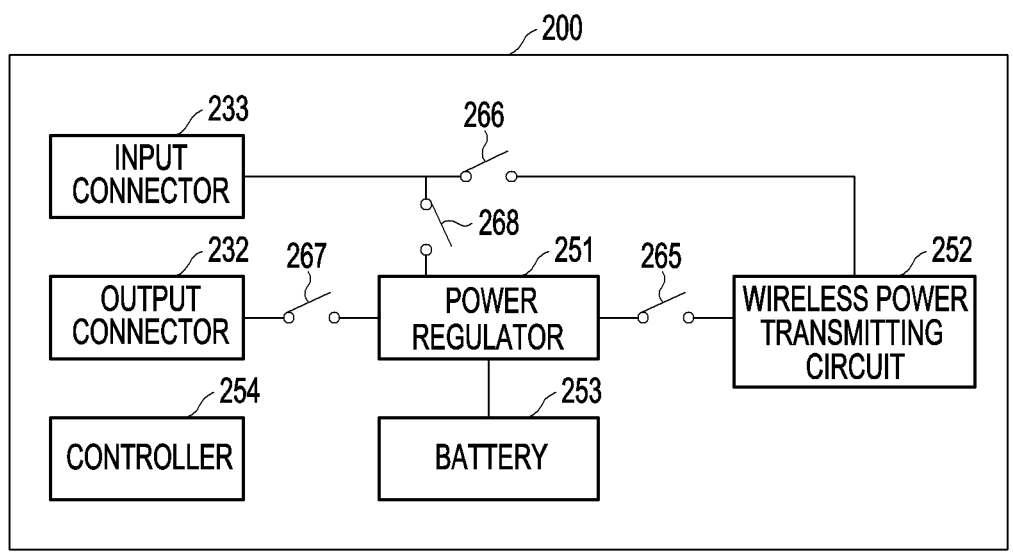

FIG. 3B is a block diagram illustrating a battery pack, according to an embodiment.

Referring to FIG. 3B, the battery pack 200 may include an output connector 232, an input connector 233, a power regulator 251, a wireless power transmitting circuit 252, a battery 253, a controller 254, and at least one or more switches 265, 266, 267, and 258. The first switch 265 may selectively and electrically connect the output terminal of the power regulator 251 with the wireless power transmitting circuit 252. The second switch 266 may selectively and electrically connect the input connector 233 with the wireless power transmitting circuit 252. The third switch 267 may selectively and electrically connect the output connector 232 with another output terminal of the power regulator 251. The fourth switch 268 may selectively and electrically connect the input connector 233 with the input terminal of the power regulator 251.

An external power supply may be connected to the input connector 233 and an external electronic device requesting charge may be connected with the output connector 232. The external electronic device may be connected to the input connector 233, and the external power supply may be connected to the output connector 232. At least one of the output connector 232 and the input connector 233 may follow, but is not limited to, various standards defined for USB, such as USB type-A, USB type-B, USB type-B super speed, USB-micro type, or USB type-C.

Where an external power supply is connected with the input connector 233, power from the external power supply may be delivered to at least one of the power regulator 251 and the wireless power transmitting circuit 252 of the battery pack 200 through the input connector 233.

For example, when the second switch 266 is in an on state, and the fourth switch 268 is in an off state, the power from the external power supply may be transferred through the input connector 233 to the wireless power transmitting circuit 252. When the second switch 266 is in an off state, and the fourth switch 268 is in an on state, the power from the external power supply may be transferred through the input connector 233 to the power regulator 251. When the second switch 266 is in an on state, and the fourth switch 268 is in an on state, the power from the external power supply may be transferred through the input connector 233 to the power regulator 251 and the wireless power transmitting circuit 252. The on/off state of the second switch 256 and the fourth switch 268 may be controlled by the controller 254 according to the current state of the battery pack 200.

The on/off state of the second switch 266 and the fourth switch 268 may be varied, even without control by the controller 254. When the second switch 266 and the fourth switch 268 are implemented as MOSFET components, the gates of the second switch 266 and the fourth switch 268 may be connected to the input connector power line. The second switch 266 and the fourth switch 268 may be turned on/off depending on the magnitude of the voltage applied to the input connector. For example, when voltage is applied to the gates of the second switch 266 and the fourth switch 268, the on/off state of the second switch 266 and the fourth switch 268 may be varied.

The controller 254 may control the on/off state of at least one switch 265, 266, 267, or 268 according to the state of the battery pack 200. The controller 254 may control the on/off state of at least one switch 265, 266, 267, or 268 based on at least one of whether the external power supply is connected to the input connector 233, whether the external electronic device is connected to the output connector 232, or whether an event to start wireless charging is detected.

When the external power supply is determined to be connected to the input connector 233 and the wireless charging initialization event is detected, the battery pack 200 may control the second switch 266 to turn on and control the first switch 265 to turn off. Accordingly, power from the external power supply may be immediately transferred through the input connector 233 to the wireless power transmitting circuit 252. The battery pack 200 may control the second switch 266 to turn on, control the first switch 265 to turn off, and control the fourth switch 268 to turn on. In this case, the battery pack 200 may use the power from the external power supply for the purposes of wireless charging and charging the battery 253. The battery pack 200 may control the second switch 266 to turn on, control the first switch 265 to turn off, and control the fourth switch 268 to turn off. In this case, the battery pack 200 may use the power from the external power supply solely for wireless charging.

When the external power supply is determined to not be connected to the connector 233 and the wireless charging initialization event is detected, the battery pack 200 may control the first switch 265 to turn on, control the third switch 267 to turn off, and control the second switch 266 to turn off. Accordingly, power from the battery 253 may be delivered through the power regulator 251 to the wireless power transmitting circuit 252. The wireless power transmitting circuit 252 may wirelessly transmit power using the power from the battery 253.

Where the external power supply is determined to be connected to the connector 233 and the wireless charging initialization event is not detected, the battery pack 200 may control the first switch 265 to turn off and control the fourth switch 268 to turn on. Therefore, power from the external power supply may be transferred through the connector 250 to the power regulator 251, and power adjusted by the power regulator 251 may be delivered to the battery 253. The battery pack 200 may control the first switch 265 to turn off, control the fourth switch 268 to turn on, and control the second switch 266 to turn off. As the second switch 266 is turned off, no power is delivered to the wireless power transmitting circuit 252, and all the power from the external power supply is delivered to the battery 253, enabling quick charging. Alternatively, the battery pack 200 may control the first switch 265 to turn off, control the fourth switch 268 to turn on, and control the second switch 266 to turn on. As the second switch 266 is turned on, power may be delivered to the wireless power transmitting circuit 252, and the wireless power transmitting circuit 252 may perform a ping phase procedure using the delivered power.

When the external electronic device is determined to be connected to the output connector 232 and the wireless charging initialization event is not detected, the battery pack 200 may control the first switch 265 to turn off and the third switch 267 to turn on. Accordingly, power from the battery 253 may be delivered through the power regulator 251 and the output connector 232 to the external electronic device. The external electronic device may be wiredly charged by the battery pack 200.

The power regulator 251 may adjust the voltage of power input from the input connector 233 and may deliver power to the wireless power transmitting circuit 252. For example, the battery pack 200 may receive power with a first voltage magnitude from the external power supply through the input connector 233. Meanwhile, the wireless power transmitting circuit 252 may be required to apply a second voltage magnitude to the coil. For example, the wireless power transmitting circuit 252 may determine the second magnitude based on information received from the electronic device requesting to be charged, such as identification information about the electronic device to be charged or information about the voltage magnitude, current, or power at, or at least, one piece of information about the electronic device to be charged. In this case, the battery pack 200 may vary (i.e., convert) the first voltage magnitude to the second magnitude using the power regulator 251 and may deliver the power with the second voltage magnitude to the wireless power transmitting circuit 252. The power regulator 251 may reduce the magnitude of the power input from the input connector 233 and may deliver power to the wireless power transmitting circuit 252.

Figure 3C:
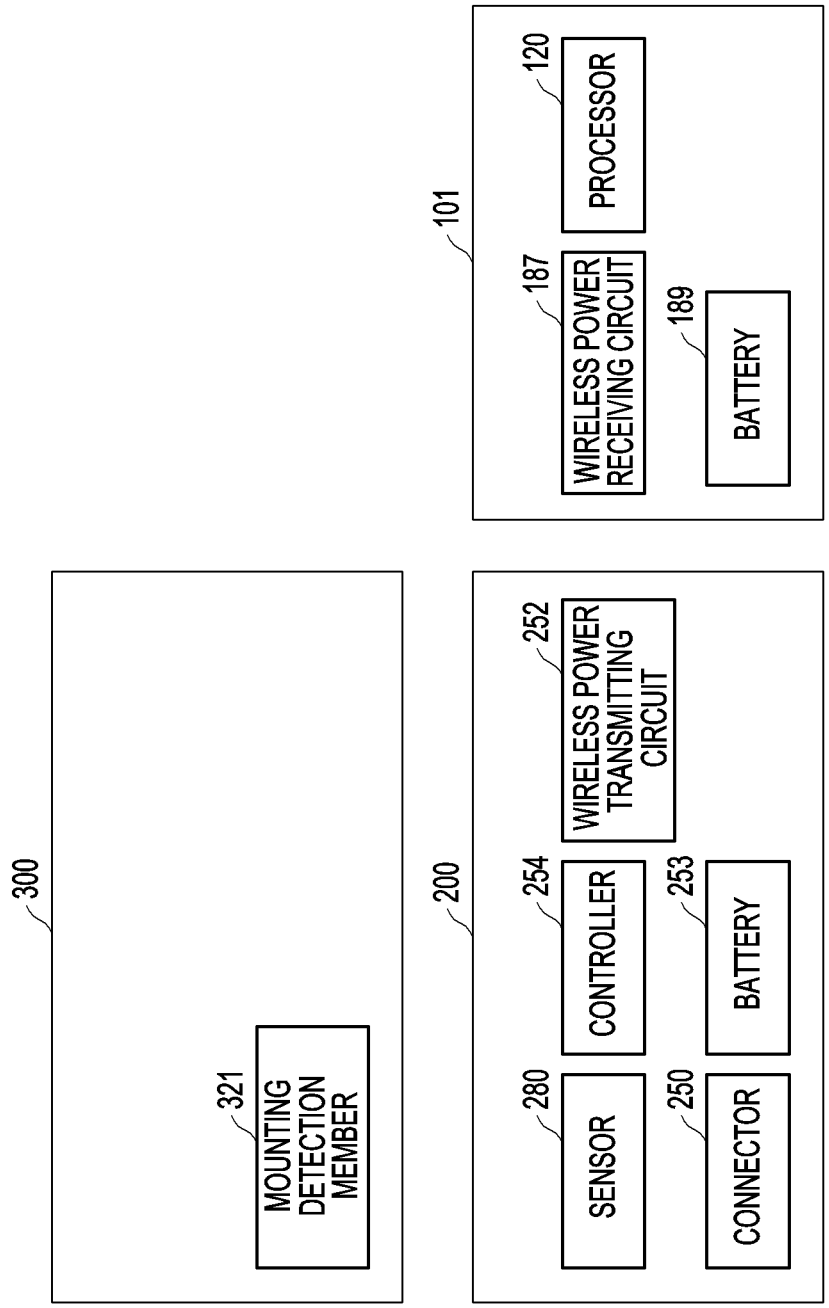
FIG. 3C is a block diagram illustrating a battery pack, according to an embodiment.

FIG. 3C is a block diagram illustrating an electronic device, a battery pack, and a case, according to an embodiment.

Referring to FIG. 3C, the battery pack 200 may include a connector 250, a wireless power transmitting circuit 252, a battery 253, a controller 254, and a sensor 280. The case 300 may include a mounting detection member. The electronic device 101 may include a processor 120, a wireless power receiving circuit 187, and a battery 189.

The sensor 280 may determine that the mounting detection member of the case 300 is positioned near the sensor 280. For example, if the mounting detection member is a magnet, the sensor 280 may include a hall sensor capable of determining the magnitude of the ambient magnetic field. The sensor 280 may deliver the measured magnitude of the magnetic field to the controller 254. Upon determining that the measured magnitude of the magnetic field is a designated magnitude or more, the controller 254 may determine that the battery pack 200 is coupled with the case 300. The controller 254 may determine the coupling of the battery pack 200 to the case 300 as a wireless charging initialization event and control the internal switch to turn on/off in order to initiate corresponding wireless charging. The wireless charging initialization event may indicate an event set to apply power to the coil for charging. Or, the wireless charging initialization event may indicate an event set to activate the wireless power transmitting circuit. In this case, upon detecting the wireless charging initialization event, the battery pack 200 may initiate a detection procedure (e.g., sending out a ping signal as per the Qi standard, applying power for detecting a short beacon as per the AFA standard, or applying a long beacon to at least one resonator), as defined by the wireless charging standards.

The battery pack 200 may control the turn-on/off state of the wireless power transmitting circuit 252 according to whether or not the wireless charging initialization event occurs. For example, at least one of the switches 265, 266, 267, or 268 may be turned on/off based on the voltage applied to the gate without any separate control signal.

The controller 254 may determine whether to turn the wireless power transmitting circuit on or off 252 based on whether the wireless charging initialization event occurs.

Upon determining that the measured magnitude of the magnetic field is a designated magnitude or more, the controller 254 may control the internal switches to turn on/off in order to initiate corresponding wireless charging. For example, when the mounting detection member is an NFC tag, the sensor 280 may include an NFC reader circuit capable of detecting the NFC tag. The sensor 280 may read the NFC tag using the NFC tag reader circuit and may transfer the result of the reading to the controller 254. Upon determining that the result of NFC tag reading corresponds to the case 300, the controller 254 may determine that the battery pack 200 is coupled with the case 300. The controller 254 may determine the coupling of the battery pack 200 and the case 300 as a wireless charging initialization event and control the internal switch to turn on/off in order to initiate corresponding wireless charging.

Upon determining that the result of NFC tag reading corresponds to the case 300, the controller 254 may control the internal switches to turn on/off in order to initiate corresponding wireless charging. For example, when the mounting detection member is implemented as a terminal connected to the ground, the sensor 280 may include a terminal connected to the terminal of the mounting detection member. The sensor 280 may measure the voltage magnitude or current applied to the terminal and may transfer the measurement to the controller 254. As the voltage or current applied to the terminal varies in magnitude, the controller 254 may determine whether the battery pack 200 is connected to the case 300. The controller 254 may determine the coupling of the battery pack 200 to the case 300 as a wireless charging initialization event and control the internal switch to turn on/off to initiate corresponding wireless charging. Upon determining that the voltage or current applied to the terminal is varied in magnitude, the controller 254 may control the internal switches to turn on/off to initiate corresponding wireless charging.

Upon detecting the wireless charging initialization event, the controller 254 may activate the wireless power transmitting circuit 252. For example, the wireless power transmitting circuit 252 may produce a magnetic field, which varies in magnitude over time, using the power from the battery 253 or the external power supply. The wireless power transmitting circuit 252 may perform a procedure as defined by various wireless charging standards (e.g., the Qi or AFA standard) to thereby detect the electronic device 101 and allow for subscription (i.e., initiation) of the electronic device 101. After the subscription of the electronic device 101, the wireless power transmitting circuit 252 may produce a magnetic field used for charging. The wireless power transmitting circuit 252 may obtain at least one of the capability information about the electronic device 101 or the remaining power, the voltage magnitude or current, or the temperature of the electronic device 101 via in-band communication or out-band communication and may determine the magnitude of current applied to the internal coil based on the obtained information. As set forth above, the communication and computation circuit of the wireless power transmitting circuit 252 may perform the detection, subscription, charging, or adjustment of the current applied. When the wireless power transmitting circuit 252 and the controller 254 are implemented in a single hardware component, the controller 254 may perform the detection, subscription, charging, or adjustment of the current applied.

The wireless power receiving circuit 187 of the electronic device 101 may wirelessly receive power from the wireless power transmitting circuit 252. The wireless power receiving circuit 187 may include a coil capable of converting the ambient magnetic field into current, a rectifying circuit for rectifying current, or a converter for adjusting the voltage magnitude of the rectified power. The battery 189 may be charged with the rectified power.

The battery pack 200 may initiate wireless charging upon detecting that it is mounted on the rear surface of the electronic device 101. Initiating wireless charging may indicate the application of power for charging to the coil or may indicate the initiation of a detection procedure (e.g., sending out a ping signal as per the Qi standard, applying power for detecting a short beacon as per the AFA standard or applying a long beacon to at least a resonator), as defined by wireless charging standards. When the electronic device 101 is detected as a result of the detection procedure, the battery pack 200 may then perform the procedures defined by the standards and wirelessly transmit power for charging. The battery pack 200 and the case 300 may be implemented in a single device, in which case the battery pack 200 and the case 300 may together be referred to as a cover device. The cover device may initiate wireless charging upon detecting the electronic device 101 being mounted.

Figure 4:
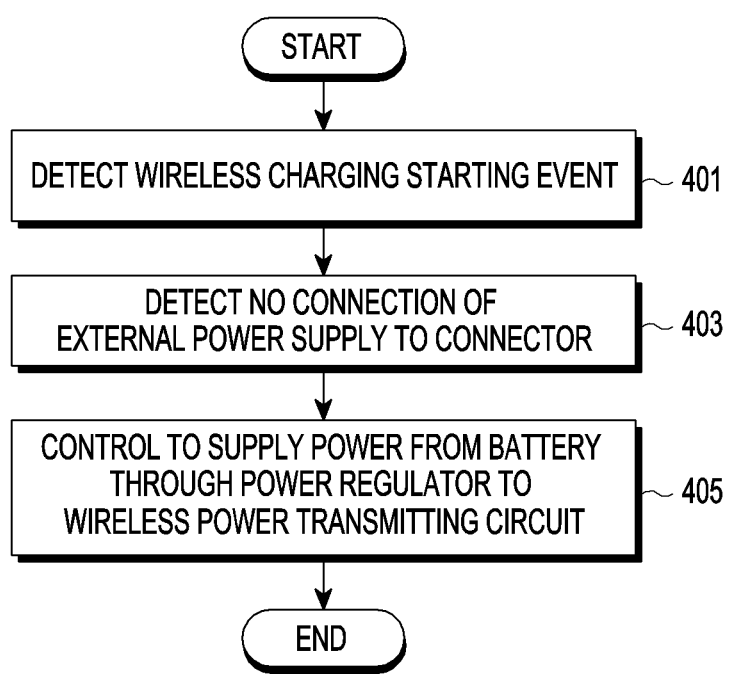
FIG. 4 is a flowchart illustrating a method for operating a battery pack, according to an embodiment.

FIG. 4 is a flowchart illustrating a method for operating a battery pack, according to an embodiment. The embodiment related to FIG. 4 is described in greater detail with reference to FIGS. 5A and 5B, which are views illustrating examples of switch connections in a battery pack, according to an embodiment.

Referring to FIG. 4, the battery pack 200 (e.g., the controller 254) detects a wireless charging initialization event in step 401. For example, the battery pack 200 may detect the wireless charging initialization event based on, at least, sensing data from the sensor 280. In step 403, the battery pack 200 detects that no external power supply is connected to the connector (e.g., the connector 250 of FIG. 5A). In step 405, the battery pack 200 performs a control to supply power from the battery (e.g., the battery 253 of FIG. 5A) through the power regulator (e.g., the power regulator 251 of FIG. 5A) to the wireless power transmitting circuit (e.g., the wireless power transmitting circuit 252 of FIG. 5A).

Figure 5A:
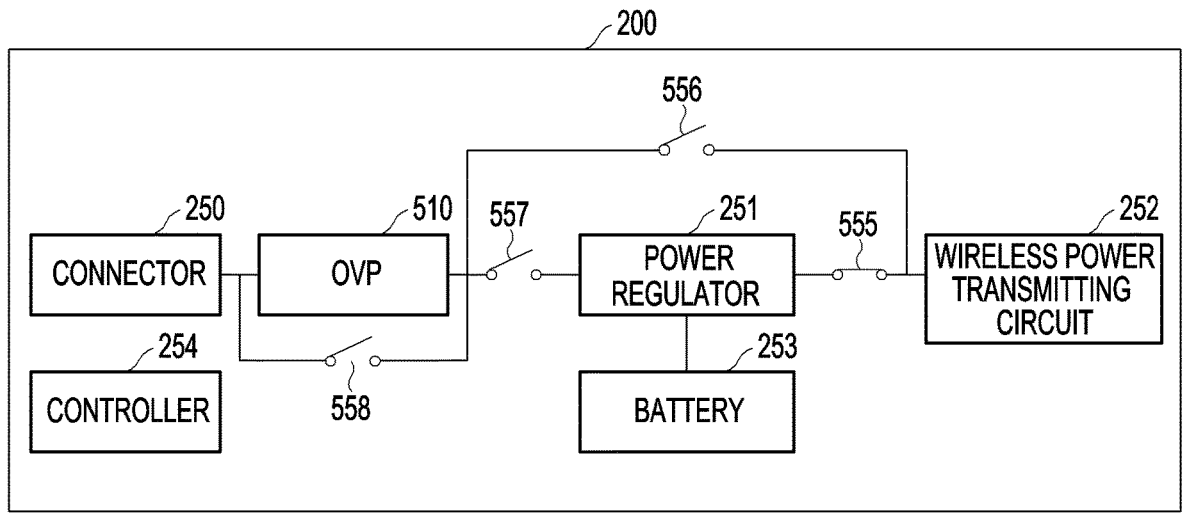
FIGS. 5A and 5B are views illustrating examples of switch connections in a battery pack, according to an embodiment.

Referring to FIG. 5A, the battery pack 200 may include the connector 250, an over voltage protection (OVP) circuit 510, the power regulator 251, the wireless power transmitting circuit 252, and the battery 253. The OVP circuit 510 may be connected to the connector 250. When the voltage power magnitude input through the connector 250 is a designated magnitude or more, the OVP circuit 510 may perform a control to not deliver power from the connector 250 to the output terminal of the OVP circuit 510. The OVP circuit 510 may enable power with a voltage of a designated magnitude or less to be delivered through the output terminal of the OVP circuit 510 to another hardware component (e.g., the power regulator 251, the wireless power transmitting circuit 252, or the battery 253).

The OVP circuit 510 may be disposed on the path from the connector 250 to another hardware component (e.g., the power regulator 251) as shown in FIG. 5A. Alternatively, the OVP circuit 510 may be included in another hardware component (e.g., the power regulator 251). For example, referring to FIG. 5A the power regulator 251 may include the OVP circuit 510. According to an embodiment, the OVP circuit 510 may lead a part of the energy to the ground by connecting the connector 250 to the ground. Thus, power passing through the OVP circuit 510 may maintain a constant voltage. The OVP circuit 510 may lead at least part of the signal's power applied to the terminal of the connector 250 to the ground.

The first switch 555 may selectively and electrically connect the power regulator 251 with the wireless power transmitting circuit 252. The second switch 556 may selectively and electrically connect the OVP circuit 510 with the wireless power transmitting circuit 252. The third switch 557 may selectively and electrically connect the OVP circuit 510 with the power regulator 251. The fourth switch 558 may selectively and electrically connect the output terminal of the connector 250 with the output terminal of the OVP circuit 510, the second switch 556, and the third switch 557.

As shown in FIG. 5A, the battery pack 200 may control the first switch 555 to turn on and the second switch 556, the third switch 557, and the fourth switch 558 to turn off. Accordingly, power from the battery 253 may be delivered through the power regulator 251 to the wireless power transmitting circuit 252. The power regulator 251 may adjust at least one of the voltage or current of the power from the battery 253 and may output the adjusted power, and the wireless power transmitting circuit 252 may wirelessly transmit power using the received power.

The switches 555 to 558 may be implemented as MOSFETs. The battery pack 200 may control the on/off state of each switch 555 to 558 by adjusting the magnitude of the voltage applied to the gate of each MOSFET. The switches 555 to 558 may turn on or off even when they do not receive any separate control signal. For example, the second switch 556 may be turned off upon detecting the voltage (e.g., V_PMID_5V) of the power regulator's 251 output terminal. The second switch 556 may be implemented as a MOSFET with a threshold voltage allowing it to be turned on upon detecting the voltage (e.g., Vbus_5V) of the OVP circuit's 510 output terminal. In this case, although no separate control signal is applied to the second switch 556, the second switch 556 is turned on when the external power supply is connected, and the second switch 556 may be turned off when the battery is wirelessly charging. The switches 555 to 558 are not limited to a particular implementation, and the controller 254 may control the on/off state of the switches 555 to 558 based on various conditions.

The battery pack 200 may transfer a wireless charging initialization signal and a signal to indicate that power from the battery is delivered to the wireless power transmitting circuit 252. The wireless power transmitting circuit 252, upon receiving the signal to indicate that power from the battery is delivered, may wirelessly transmit a first power magnitude. For example, the first magnitude may be smaller than the power magnitude that the wireless power transmitting circuit 252 wirelessly transmits when the external power supply is connected to the battery pack 200.

As described above in connection with FIG. 5A, when the battery pack 200 performs a wireless charge using the battery 253, wired charging via the connector 250 may be deactivated. Alternatively, however, when the battery pack 200 performs a wireless charge using the battery 253, the battery pack 200 may activate wired charging via the connector 250. In this case, the battery pack 200 may control the first switch 555, control the third switch 557, and control the fourth switch 558 to turn on and control the second switch 556 to turn off. The battery pack 200 may wiredly charge the external electronic device (e.g., the electronic device 101 or another electronic device) connected via the connector 250 while performing a wireless charge.

Figure 5B:
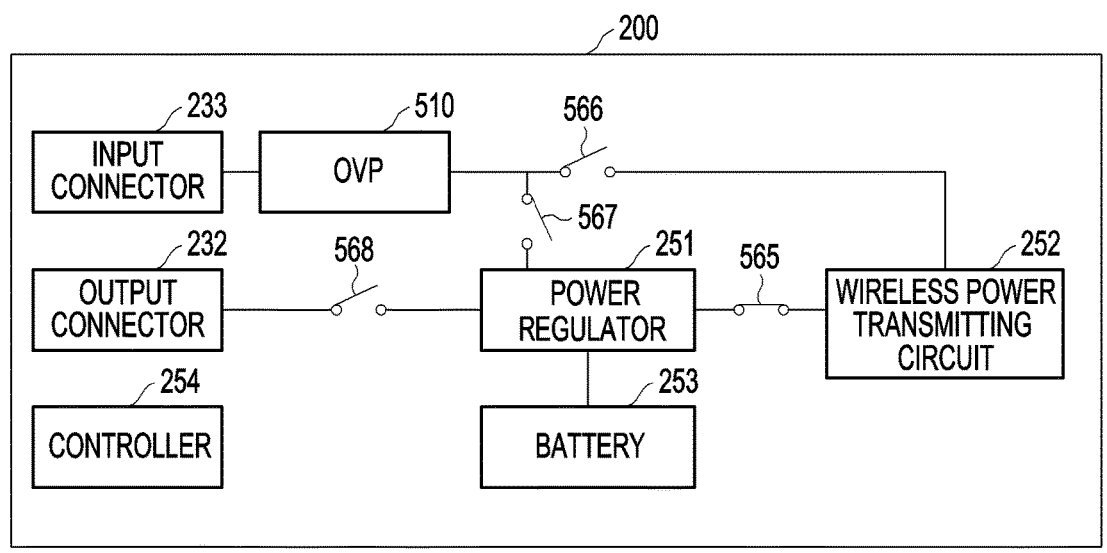

Referring to FIG. 5B, the battery pack 200 may include the output connector 232, the input connector 233, the OVP circuit 510, the power regulator 251, the wireless power transmitting circuit 252, and the battery 253. The OVP circuit 510 may be connected to the input connector 233. When the voltage magnitude of the power input through the input connector 233 is a designated magnitude or more, the OVP circuit 510 may perform a control to not deliver power from the input connector 233 to the output terminal of the OVP circuit 510. The OVP circuit 510 may be disposed on the path from the input connector 233 to another hardware component (e.g., the power regulator 251) as shown in FIG. 5B. Alternatively, the OVP circuit 510 may be included in another hardware component (e.g., the power regulator 251). For example, referring to FIG. 3A, the power regulator 251 may include the OVP circuit 510. The OVP circuit 510 may lead a part of the energy to the ground by connecting the connector 250 to the ground. Thus, power passing through the OVP circuit 510 may maintain a constant voltage. The OVP circuit 510 may lead a part of the signal's power applied to the terminal of the connector 250 to the ground.

The first switch 565 may selectively and electrically connect the power regulator 251 with the wireless power transmitting circuit 252. The second switch 566 may selectively and electrically connect the OVP circuit 510 with the wireless power transmitting circuit 252. The third switch 567 may selectively and electrically connect the OVP circuit 510 with the power regulator 251. The fourth switch 568 may selectively and electrically connect the output terminal of the output connector 232 with the power regulator 251. For example, as shown in FIG. 5B, the battery pack 200 may control the first switch 565 to turn on, and the battery pack 200 may control the second switch 566, control the third switch 567, and control the fourth switch 568 to turn off. Accordingly, power from the battery 253 may be delivered through the power regulator 251 to the wireless power transmitting circuit 252. The power regulator 251 may adjust at least one of the voltage or current of the power from the battery 253 and may output the adjusted power, and the wireless power transmitting circuit 252 may wirelessly transmit power using the received power.

As described above in connection with FIG. 5B, when the battery pack 200 performs a wireless charge using the battery 253, wired charging via the connector 250 may be deactivated. Alternatively, however, when the battery pack 200 performs a wireless charge using the battery 253, the battery pack 200 may activate wired charging via the connector 250. In this case, the battery pack 200 may control the first switch 565 and control the fourth switch 568 to turn on, and the battery pack 200 may control the second switch 566 and control the third switch 567 to turn off. The battery pack 200 may wiredly charge the external electronic device connected via the connector 232 while performing a wireless charge.

Figure 6:
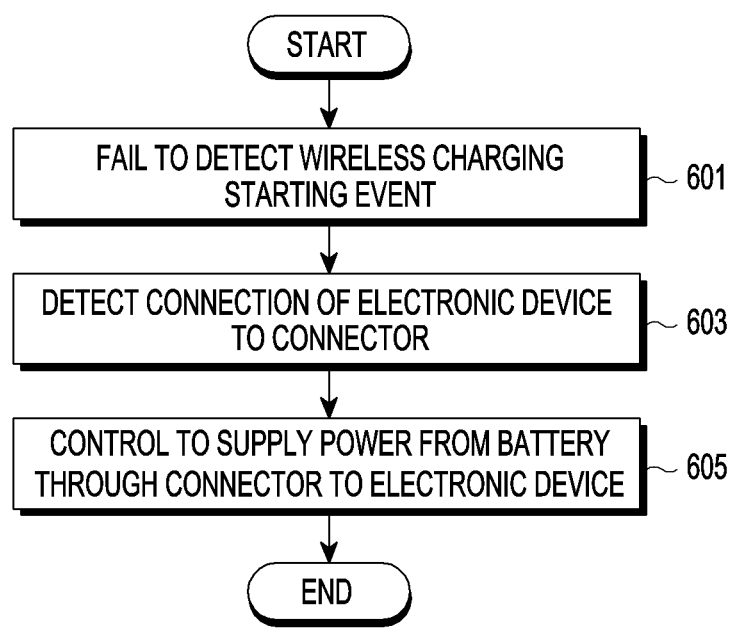
FIG. 6 is a flowchart illustrating a method for operating a battery pack, according to an embodiment.

FIG. 6 is a flowchart illustrating a method for operating a battery pack, according to an embodiment. The embodiment related to FIG. 6 is described in greater detail with reference to FIGS. 7A and 7B, which are views illustrating examples of switch connections in a battery pack, according to an embodiment.

Referring to FIG. 6, the battery pack 200 may fails to detect a wireless charging initialization event in step 601. For example, the battery pack 200 may fail to detect the mounting detection member included in the case 300 and may thus fail to detect a wireless charging initialization event. While it may detect the mounting detection member, the battery pack 200 may fail to proceed with a procedure as defined by wireless charging standards. In this case, the battery pack 200 may determine not to perform wireless charging. In step 603, the battery pack 200 detects the connection of the electronic device to the connector (e.g., the connector 250 of FIG. 7A). In step 605, the battery pack 200 performs a control to supply power from the battery (e.g., the battery 253 of FIG. 7A) through the connector (e.g., the connector 250 of FIG. 7A) to the electronic device.

Figure 7A:
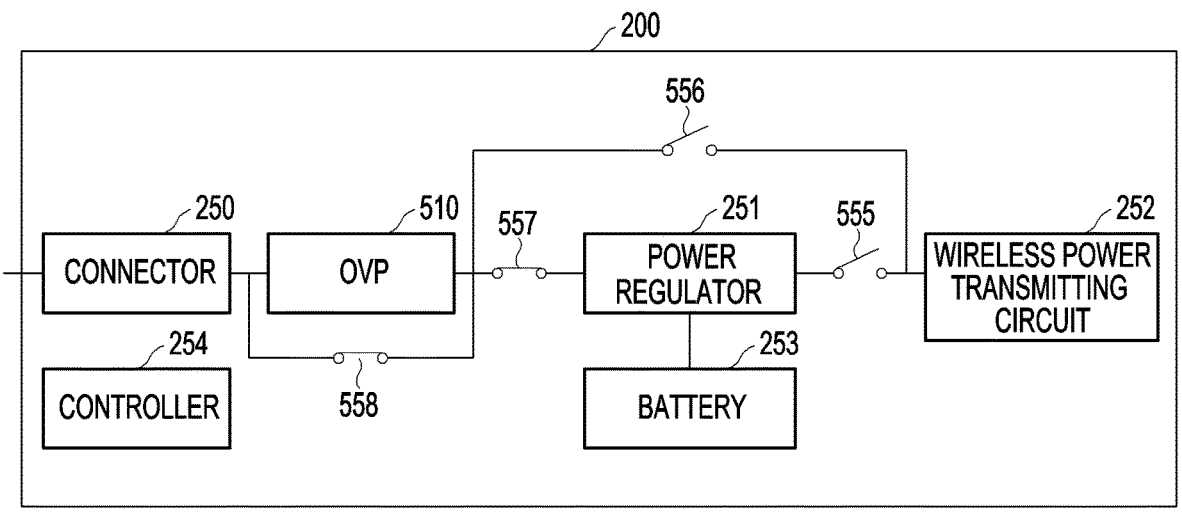
FIGS. 7A and 7B are views illustrating examples of switch connections in a battery pack, according to an embodiment.

Referring to FIG. 7A, the battery pack 200 may control the third switch 557 and control the fourth switch 558 to turn on, and the battery pack 200 may control the first switch 555 and control the second switch 556 to turn off. Accordingly, power from the battery 253 may be delivered through the power regulator 251 to the connector 250. Thus, power from the battery 253 may be delivered to an external electronic device connected to the connector 250. The power regulator 251 may adjust either the voltage or current of the power from the battery 253 and may output the adjusted power, and the wireless power transmitting circuit 252 may wirelessly transmit power using the received power. The power regulator 251 may boost-convert (i.e., increase the voltage of) or buck-convert (i.e., decrease the voltage of) the power from the battery 253. The controller 254 may obtain information related to the rated power, rated voltage, and rated current of the external electronic device connected to the connector 250. For example, when the connector 250 is implemented as a USB type C connector, the controller 254 may transmit or receive data to/from the external electronic device via at least one data transmission/reception terminal (e.g., D+ terminal or D− terminal) of the connector 250. The controller 254 may obtain information associated with the external electronic device through the data transmission/reception terminal. The battery pack 200 may obtain the information associated with the external electronic device based on the external input voltage applied to the connector 250 or the state of the data line (e.g., whether it is grounded or whether communication is activated). The controller 254 may determine the degree of adjustment of at least one of the voltage or current of the power regulator 251 based on, at least, the received information associated with the external electronic device. Thus, the power regulator 251 may adjust at least one of the voltage or current from the battery 253 based on the external electronic device connected to the outside.

The switches 555 to 558 may turn on or off even when they do not receive any separate control signal. For example, the third switch 557 and the fourth switch 558 may be implemented as MOSFETs with a threshold voltage to allow them to be turned on when the voltage (e.g., Vin_5V) at the output terminal of the connector 250 is a designated value or more, and the third switch 557 and the fourth switch 558 may be turned off when the voltage (e.g., Vin_5V) at the output terminal of the connector 250 is less than the designated value. In this case, although no separate control signal is applied to the third switch 557 and the fourth switch 558, the third switch 557 and the fourth switch 558 may be turned on when the external electronic device is connected to the connector 250. The voltage (Vbus_5V_in) at the input terminal of the power regulator 251 may be applied as the voltage (Vbus_5V) at the input terminal of the second switch 556. Thus, the voltage (Vbus_5V_in) at the input terminal of the power regulator 251 may also be applied to the wireless power transmitting circuit 252 through the second switch 556, and the wireless power transmitting circuit 252 may perform a ping-phase procedure using the voltage. Upon detecting an electronic device requesting wireless charging, the wireless power transmitting circuit 252 may perform a power transmit phase procedure. When no electronic device requesting wireless charging is detected, the wireless power transmitting circuit 252 may be deactivated again.

The controller 254 may apply a signal to the third switch 557 to control the third switch 557 to turn on and may apply a signal to the fourth switch 558 to control the fourth switch 558 to turn on. The controller 254 may abstain from applying the signal to the second switch 556 to control the second switch 556 to turn on. Where a separate key input is detected, the controller 254 may apply the signal to the second switch 556 to control the second switch 556 to turn on. Furthermore, the controller 254 may transfer a signal to turn on the wireless power transmitting circuit 252 and transfer a signal to indicate the battery mode to the wireless power transmitting circuit 252. For example, although the battery pack 200 is not coupled to the case 300, the user may want to wirelessly charge another electronic device on the battery pack 200. For example, when a hardware button in the battery pack 200 is pressed, the battery pack 200 may initiate the procedure for wireless charging. Accordingly, the second switch 556 may be controlled to turn on, and power from the battery 253 may be delivered through the power regulator 251 to the wireless power transmitting circuit 252. The wireless power transmitting circuit 252 may perform a procedure defined in the ping phase (e.g., sending out a ping signal) using the received power, and upon detecting an electronic device requesting a wireless charge, the wireless power transmitting circuit 252 may wirelessly transmit power. Alternatively, power from the battery 253 may be delivered through the power regulator 251 to the wireless power transmitting circuit 252. In this case, the first switch 555 may be controlled to turn on. The power regulator 251 may adjust the voltage of the power from the battery 253 to a magnitude processed by the wireless power transmitting circuit 252 and may provide the adjusted power to the wireless power transmitting circuit 252.

Alternatively, despite failing to connect to the external power supply and failing to detect a wireless charging initialization event, the battery pack 200 may control the second switch 556 to turn on. In this case, the controller 254 may activate or deactivate wireless charging depending on the application of a signal to turn on the wireless power transmitting circuit 252.

Figure 7B:
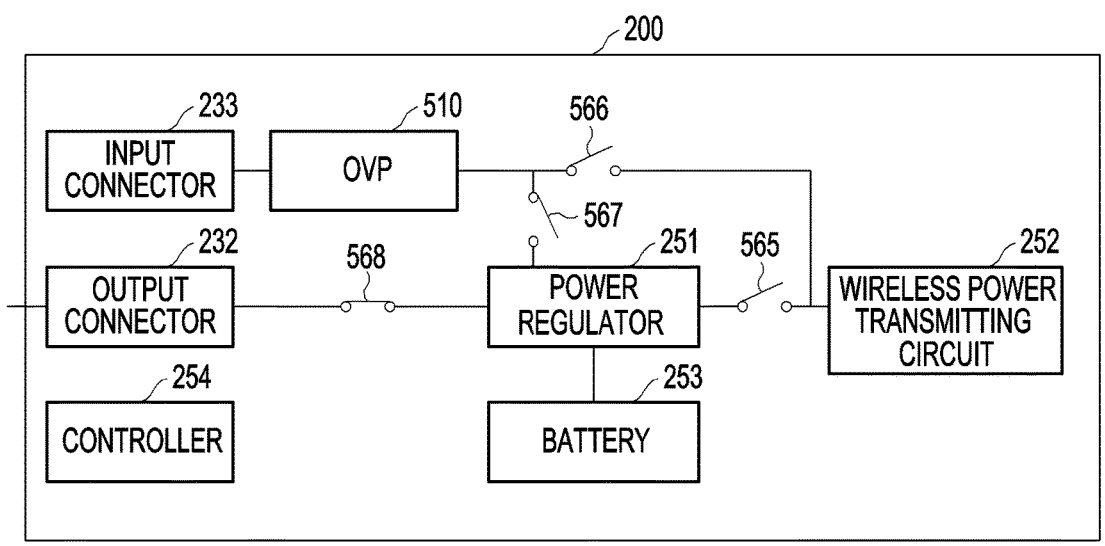

Referring to FIG. 7B, when the connection between the external electronic device and the output connector 232 is detected, and the detection of a wireless charging initialization event fails, the battery pack 200 may control the fourth switch 568 to turn on, and the batter pack 200 may control the first switch 565, control the second switch 566, and control the third switch 567 to turn off. Power from the battery 253 may be provided through the power regulator 251 to the output connector 232, and the external electronic device connected to the output connector 232 may thus receive the power from the battery 253 of the battery pack 200. The power regulator 251 may adjust either the voltage or current of the power from the battery 253 and output the adjusted power.

As described above in connection with FIG. 5B, when the battery pack 200 performs a wired charge using the battery 253, the battery pack 200 may deactivate wireless charging using the wireless power transmitting circuit 252. Alternatively, when the battery pack 200 performs a wired charge using the battery 253, the battery pack 200 may activate wireless charging via the wireless power transmitting circuit 252. In this case, the battery pack 200 may control the first switch 565 and control the fourth switch 568 to turn on, and the battery pack 200 may control the second switch 566 and control the third switch 567 to turn off. Or, the battery pack 200 may control the first switch 565 to turn off, and the battery pack 200 may control the second switch 566, control the third switch 567, and control the fourth switch 568 to turn on. The battery pack 200 may wiredly charge the external electronic device connected via the connector 232 while performing a wireless charge.

Figure 8A:
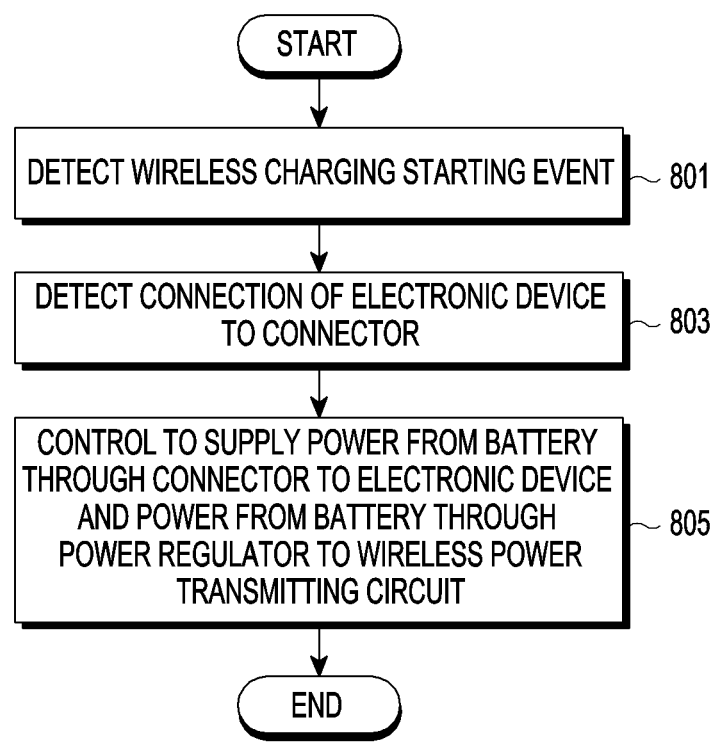
FIG. 8A is a flowchart illustrating a method for operating a battery pack, according to an embodiment.

FIG. 8A is a flowchart illustrating a method for operating a battery pack, according to an embodiment. The embodiment related to FIG. 8A is described in further detail with reference to FIGS. 8B and 8C, which are views illustrating an example of coupling a battery pack, according to an embodiment.

Figure 8B:
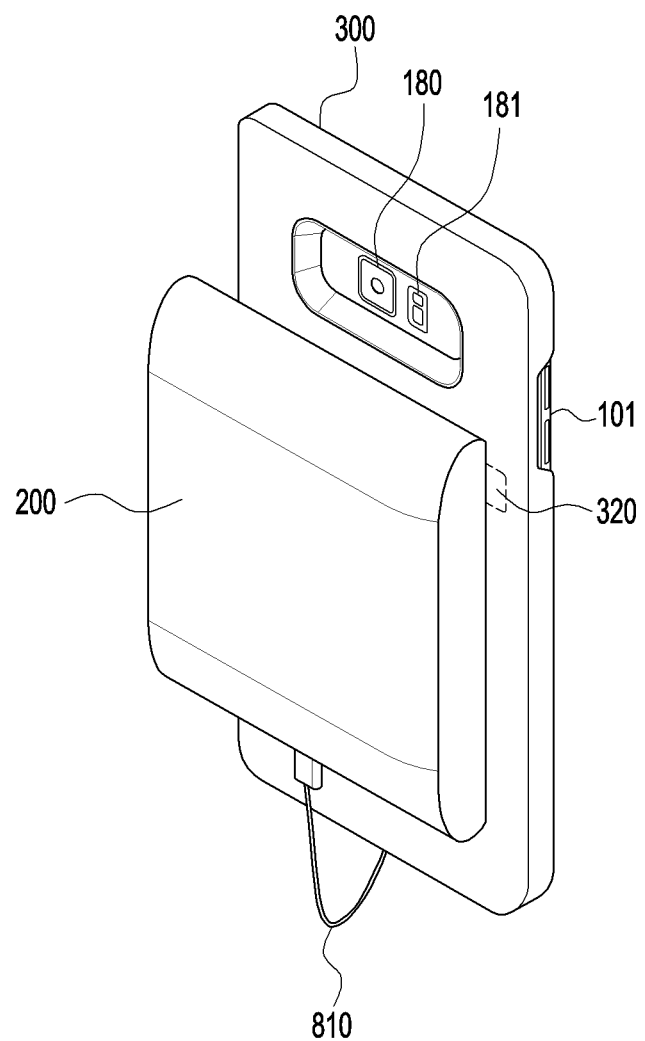
FIGS. 8B and 8C are views illustrating an example of coupling a battery pack, according to an embodiment.
Figure 8C:
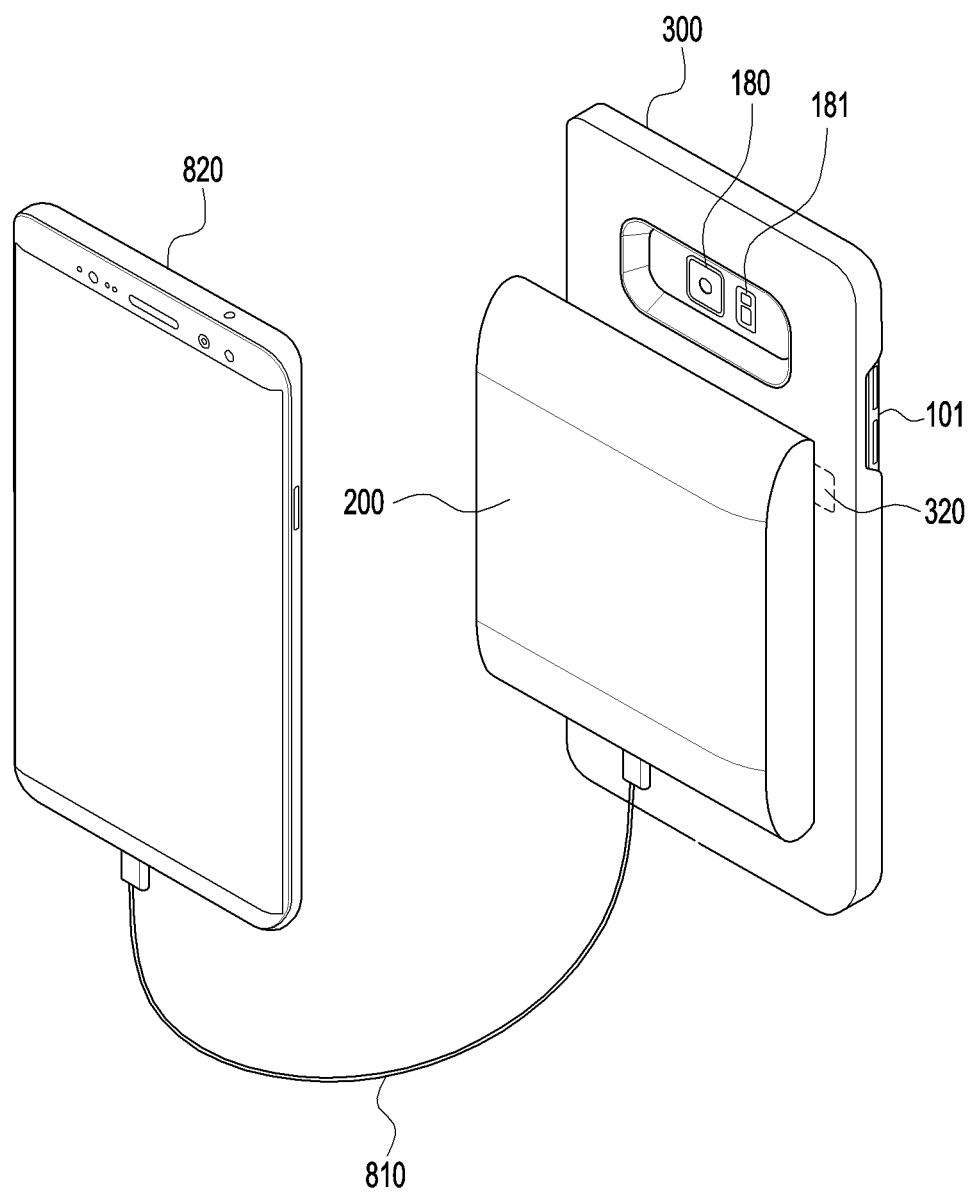

Referring to FIG. 8A, the battery pack 200 detects a wireless charging initialization event in step 801. For example, the battery pack 200 may detect the mounting of the battery pack 200 in the case 300 containing the electronic device 101 as the wireless charging initialization event. Alternatively, the battery pack 200 may detect the placement of the battery pack 200 on, at least one, surface (e.g., the rear surface) of the electronic device 101 as the wireless charging initialization event. In step 803, the battery pack 200 detects the connection of an electronic device (e.g., the electronic device 101 or another electronic device) to the connector. For example, the battery pack 200 may be connected to the electronic device 101 via a wire cable 810 as shown in FIG. 8B. In other words, while the battery pack 200 is mounted in the case 300 containing the electronic device 101, the battery pack 200 may be wired to the electronic device 101. While the battery pack 200 is placed on one surface of the case 300 containing the electronic device 101, as shown in FIG. 8C, the battery pack 200 may be connected with another electronic device 820, which is not received (i.e. housed) in the case 300, via the wire cable 810. In step 805, the battery pack 200 performs a control to supply power from the battery 253 through the power regulator 251 and the connector 250 to the electronic device wired to the connector 250, and the battery pack 200 performs a control to supply power from the battery 253 through the power regulator 251 to the wireless power transmitting circuit 252, which is described below in greater detail with reference to FIGS. 9A and 9B. Thus, in the case shown in FIG. 8B, the battery pack 200 may wiredly and wirelessly charge the electronic device 101 using the power from the battery 253. In the case shown in FIG. 8C, the battery pack 200 may wirelessly charge the electronic device 101 while simultaneously wiredly charging the other electronic device 820, using the power from the battery 253.

Figure 9A:
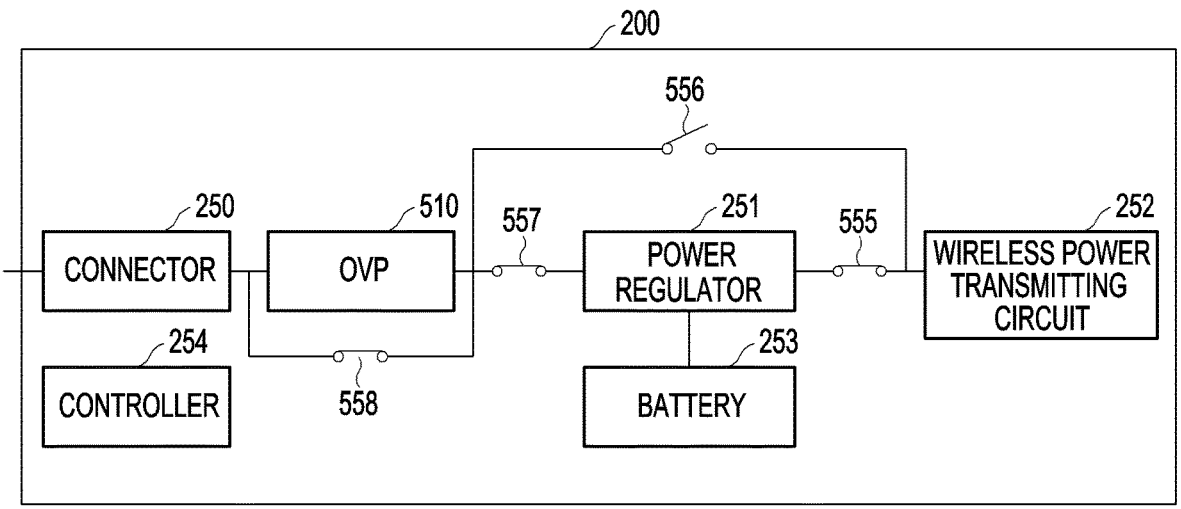
FIGS. 9A and 9B are block diagrams illustrating a battery pack, according to an embodiment.
Figure 9B:
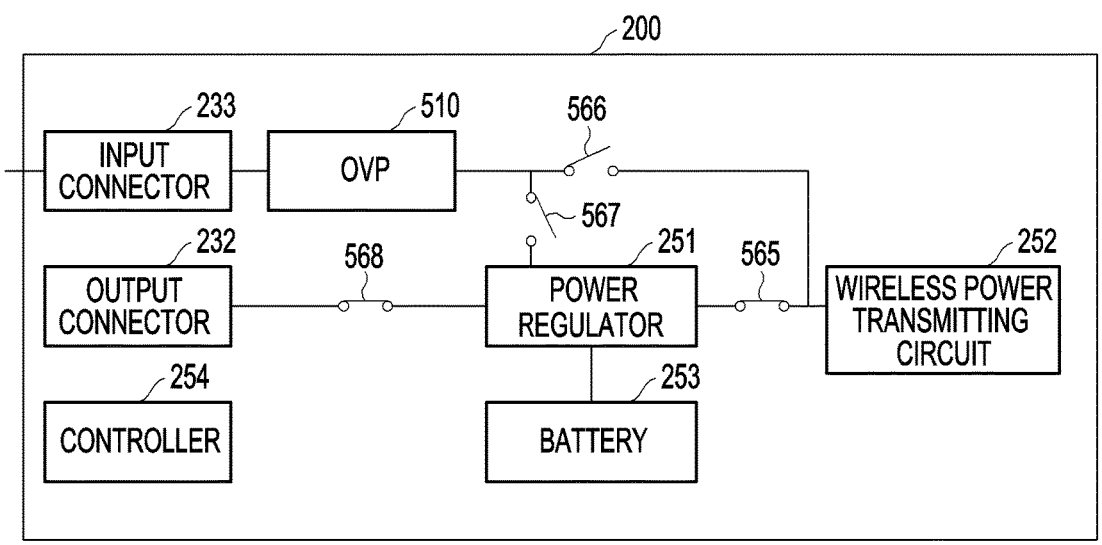

FIGS. 9A and 9B are block diagrams illustrating a battery pack, according to an embodiment.

Referring to FIG. 9A, upon detecting a wireless charging initialization event and upon detecting the connection between the electronic device and the connector 250 as shown in FIG. 8A, the battery pack 200 may control the first switch 555, control the third switch 557, and control the fourth switch 558 to turn on, and the battery pack 200 may control the second switch 556 to turn off. Accordingly, power from the battery 253 may be delivered through the power regulator 251 to the wireless power transmitting circuit 252. Furthermore, power from the battery 253 may be transferred through the power regulator 251, through the third switch 557, through the fourth switch 558, and through the connector 250 to an external electronic device. For example, the power regulator 251 may deliver first power from the battery 253 to the wireless power transmitting circuit 252 and deliver second power to the connector 250. The power regulator 251 may set the degree of voltage adjustment for the first power to be different than the degree of voltage adjustment for the second power. In this case, the voltage magnitude of the power delivered through the connector 250 to the external electronic device may differ from the voltage magnitude of the power delivered to the wireless power transmitting circuit 252.

Referring to FIG. 9B, upon detecting a wireless charging initialization event and connection of the electronic device to the output connector 232, the battery pack 200 may control the first switch 565 and control the fourth switch 568 to turn on, and the battery pack 200 may control the second switch 566 and control the third switch 567 to turn off. Accordingly, power from the battery 253 may be delivered through the power regulator 251 to the wireless power transmitting circuit 252. Furthermore, power from the battery 253 may be transferred through the power regulator 251, through the fourth switch 568, and through the output connector 232 to an external electronic device. For example, the power regulator 251 may deliver first power from the battery 253 to the wireless power transmitting circuit 252 and deliver second power to the output connector 232. The power regulator 251 may set the degree of voltage adjustment for the first power to be different than the degree of voltage adjustment for the second power. In this case, the voltage magnitude of the power delivered through the output connector 232 to the external electronic device may differ from the voltage magnitude of the power delivered to the wireless power transmitting circuit 252.

Figure 10:
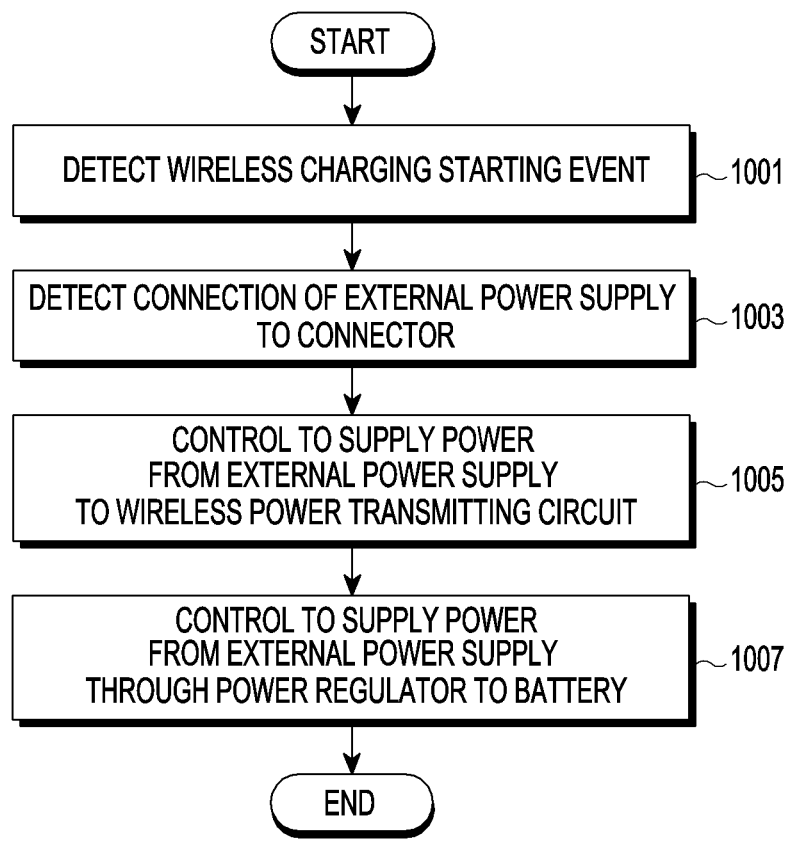
FIG. 10 is a flowchart illustrating a method for operating a battery pack, according to an embodiment.

FIG. 10 is a flowchart illustrating a method for operating a battery pack, according to an embodiment. The embodiment related to FIG. 10 is described in greater detail with reference to FIGS. 11A and 11B, which are views illustrating examples of switch connections in a battery pack, according to an embodiment.

Referring to FIG. 10, the battery pack 200 detects a wireless charging initialization event in step 1001. In step 1003, the battery pack 200 detects the connection between an external power supply and the connector 250. In step 1005, the battery pack 200 performs a control to supply power from the external power supply to the wireless power transmitting circuit 252. The battery pack 200, upon recognizing a detection member included in the case 300, may supply power to the corresponding wireless power transmitting circuit 252. In step 1007, the battery pack 200 performs a control to supply power from the external power supply through the power regulator 251 to the battery 253.

Figure 11A:
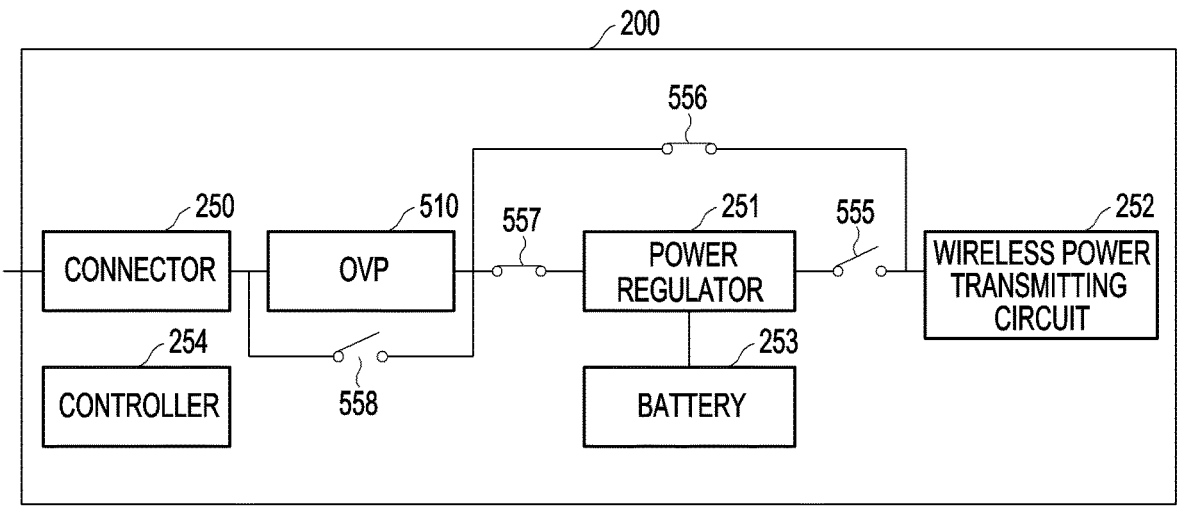
FIGS. 11A and 11B are views illustrating examples of switch connections in a battery pack, according to an embodiment.

Referring to FIG. 11A, the battery pack 200 may control the first switch 555 and control the fourth switch 558 to turn off, and the battery pack 200 may control the second switch 556 and control the third switch 557 to turn on. For example, the battery pack 200 may transfer a signal (C) to the third switch 557 to control the third switch 557 to turn on, and the second switch 566 may be turned on without a separate control signal because the voltage (Vbus_5V) at the input terminal of the second switch 556 is applied, as described above. Thus, power from the external power supply connected with the connector 250 may be delivered through the connector 250, through the OVP circuit 510, and through the second switch 556 to the wireless power transmitting circuit 252. The wireless power transmitting circuit 252 may wirelessly transmit power using the power from the external power supply. Furthermore, power from the external power supply may be delivered through the connector 250, the OVP circuit 510, the third switch 557, and the power regulator 251 to the battery 253. In this case, the controller 254 may communicate with the external power supply via the connector 250. For example, when the connector 250 is implemented as a USB type C connector, the controller 254 may transmit or receive data to/from the external power supply via at least one data transmission/reception terminal (e.g., D+ terminal or D− terminal) of the connector 250. The controller 254 may request the external power supply to provide power with a designated voltage magnitude (e.g., 5V). The designated voltage magnitude may be the magnitude of the voltage used by the wireless power transmitting circuit 252 or the magnitude of the voltage required for charging the battery 253.

As set forth above, the power from the external power supply may be delivered through the connector 250 to the wireless power transmitting circuit 252 and the battery 253, thus allowing wireless charging and charging of the battery 253 to be carried out simultaneously. The controller 254 may deliver a wireless charging initialization signal to the wireless power transmitting circuit 252. Meanwhile, the controller 254 may abstain from transferring the signal to indicate that power from the battery is delivered to the wireless power transmitting circuit 252.

The wireless power transmitting circuit 252 may be operated differently from when it receives power from the battery 253. For example, the wireless power transmitting circuit 252 may wirelessly transmit a larger power magnitude when receiving power from the external power supply and performing wireless charging compared to when receiving power from the battery 253 and performing a wireless charge.

Figure 11B:
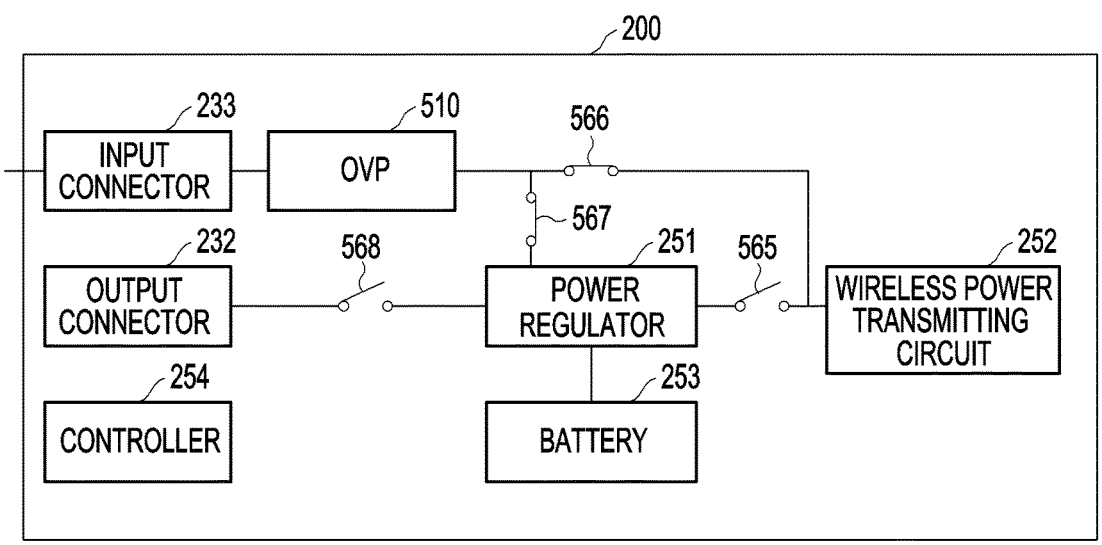

Referring to FIG. 11B, upon detecting the connection between the external power supply and the input connector 233 and upon detecting the wireless charging initialization event, the battery pack 200 may control the first switch 565 and control the fourth switch 568 to turn off, and the battery pack 200 may control the second switch 566 and control the third switch 567 to turn on. Thus, power from the external power supply connected with the input connector 233 may be delivered through the input connector 233, through the OVP circuit 510, and through the second switch 566 to the wireless power transmitting circuit 252. The wireless power transmitting circuit 252 may wirelessly transmit power using the power from the external power supply. Furthermore, power from the external power supply may be delivered through the input connector 233, the OVP circuit 510, the third switch 567, and the power regulator 251 to the battery 253. As set forth above, the power from the external power supply may be delivered through the connector 250 to the wireless power transmitting circuit 252 and the battery 253, thus allowing wireless charging and charging of the battery 253 to be carried out simultaneously.

Figure 12:
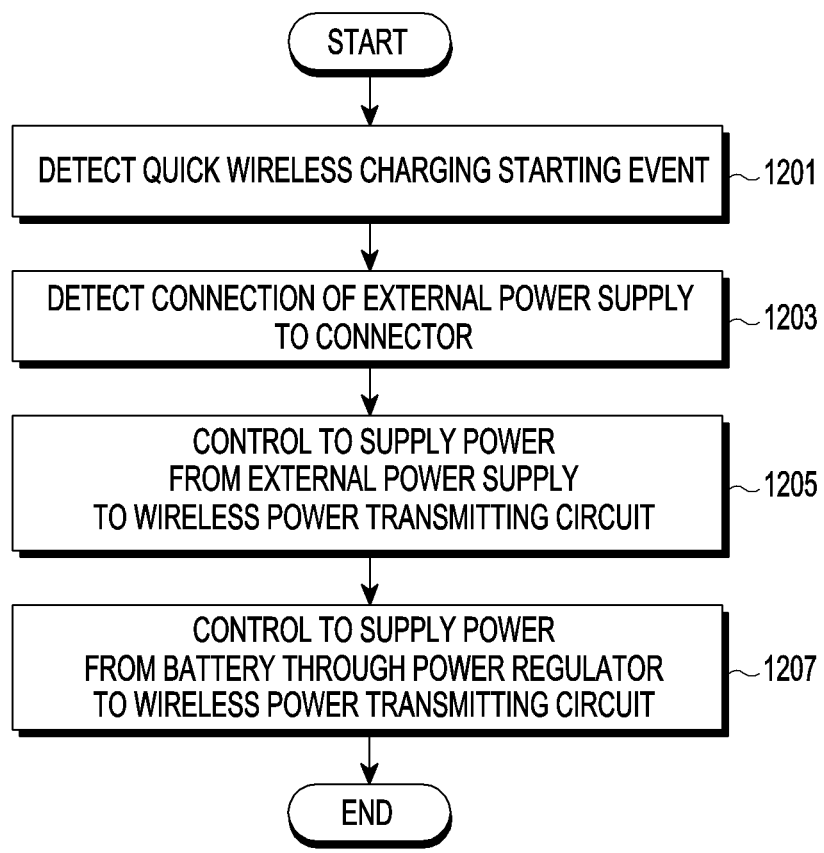
FIG. 12 is a flowchart illustrating a method for operating a battery pack, according to an embodiment.

FIG. 12 is a flowchart illustrating a method for operating a battery pack, according to an embodiment. The embodiment related to FIG. 12 is described in greater detail with reference to FIGS. 13A and 13B, which are views illustrating examples of switch connections in a battery pack, according to an embodiment.

Referring to FIG. 12, the battery pack 200 detects an event to initiate quick wireless charging (e.g., first wireless charging) while in step 1201. For example, the electronic device 101 may transmit quick charging identification information, and the battery pack 200 may determine whether or not to perform quick charging by identifying the quick charging identification information. After the ping phase, the electronic device 101 may exchange identification information with the battery pack 200 and may then transmit quick charging request information to the battery pack 200. The battery pack 200 may initiate quick charging based on the received quick charging request information. The electronic device 101 may display a user interface for inputting a quick wireless charging command to the display device 160. When the quick wireless charging command is entered through the user interface, the electronic device 101 may send a quick wireless charging request to the battery pack 200. Alternatively, when authentication for the case 300 is performed, the electronic device 101 may send a quick wireless charging request to the battery pack 200, which is described below in further detail.

Figure 13A:
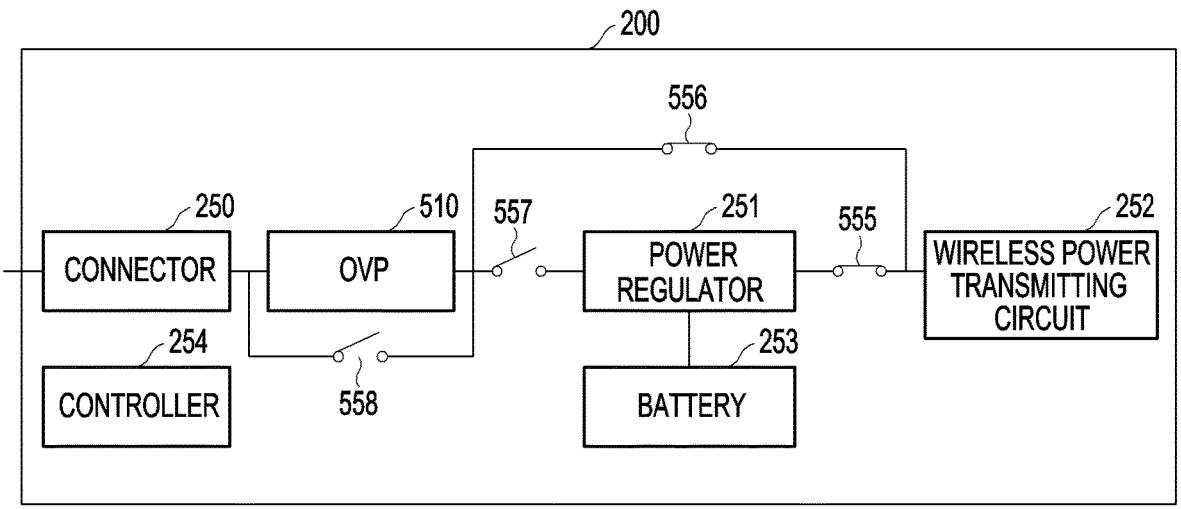
FIGS. 13A and 13B are views illustrating examples of switch connections in a battery pack, according to an embodiment.

As set forth above, the electronic device 101 may send a quick wireless charging request in an on/off keying scheme via in-band communication when it follows Qi standard schemes. The electronic device 101 may send a quick wireless charging request via out-band communication (e.g., BLE communication) when it follows AFA standard schemes. In step 1203, the battery pack 200 detects a connection of an external power supply to the connector 250. In step 1205, the electronic device 101 performs a control to supply power from the external power supply to the wireless power transmitting circuit 252. In step 1207, the electronic device 101 performs a control to supply power from the battery 253 through the power regulator 251 to the wireless power transmitting circuit 252. For example, as shown in FIG. 13A, the battery pack 200 may control the first switch 555 and control the second switch 556 to turn on, and the battery pack 200 may control the third switch 557 and control the fourth switch 558 to turn off. Thus, power from the external power supply may be delivered through the connector 250, the OVP circuit 510, and the second switch 556 to the wireless power transmitting circuit 252. Accordingly, power from the battery 253 may be delivered through the power regulator 251 and the first switch 555 to the wireless power transmitting circuit 252. The wireless power transmitting circuit 252 may wirelessly transmit power using the power from the battery 253 and the external power supply. Furthermore, as the third switch 557 is controlled to turn off, power from the external power supply may not be delivered to the battery 253 but instead delivered only to the wireless power transmitting circuit 252. While quick wireless charging is performed, a magnetic field with an amplitude larger than a magnetic field produced when normal wireless charging (e.g., second wireless charging) is performed may be produced, accelerating the charging of the electronic device 101.

Figure 13B:
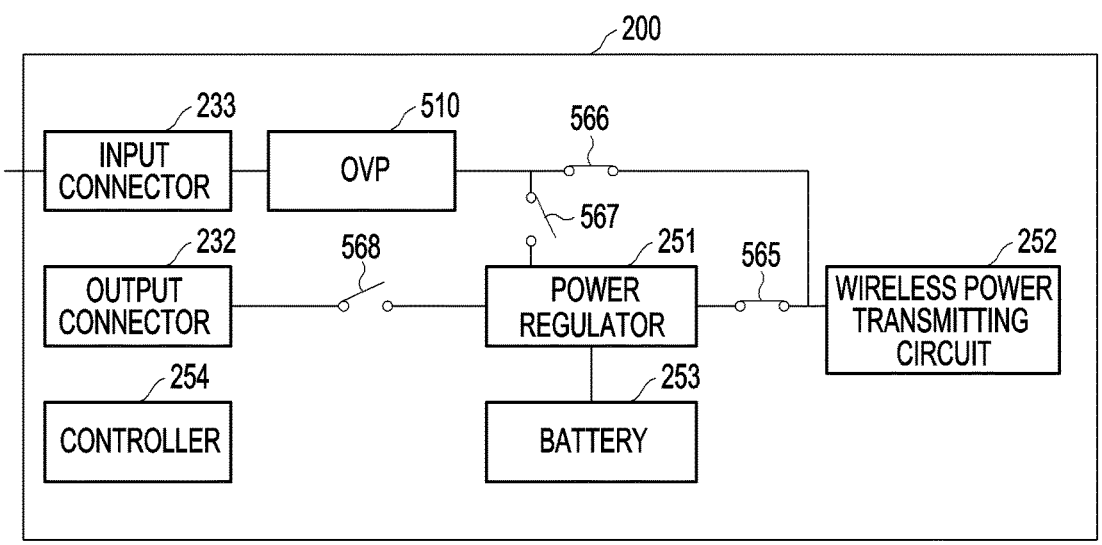

Referring to FIG. 13B, the battery pack 200 may detect the connection of the external power supply to the input connector 233 and detect the quick wireless charging request. The battery pack 200 may control the first switch 565 and control the second switch 566 to turn on, and the battery pack 200 may control the third switch 567 and control the fourth switch 568 to turn off. Thus, power from the external power supply may be delivered through the input connector 233, through the OVP circuit 510, and through the second switch 566 to the wireless power transmitting circuit 252. Accordingly, power from the battery 253 may be delivered through the power regulator 251 and the first switch 565 to the wireless power transmitting circuit 252. The wireless power transmitting circuit 252 may wirelessly transmit power using the power from the battery 253 and the external power supply. Furthermore, as the third switch 567 is controlled to turn off, power from the external power supply may not be delivered to the battery 253 but instead delivered to only the wireless power transmitting circuit 252.

Figure 14:
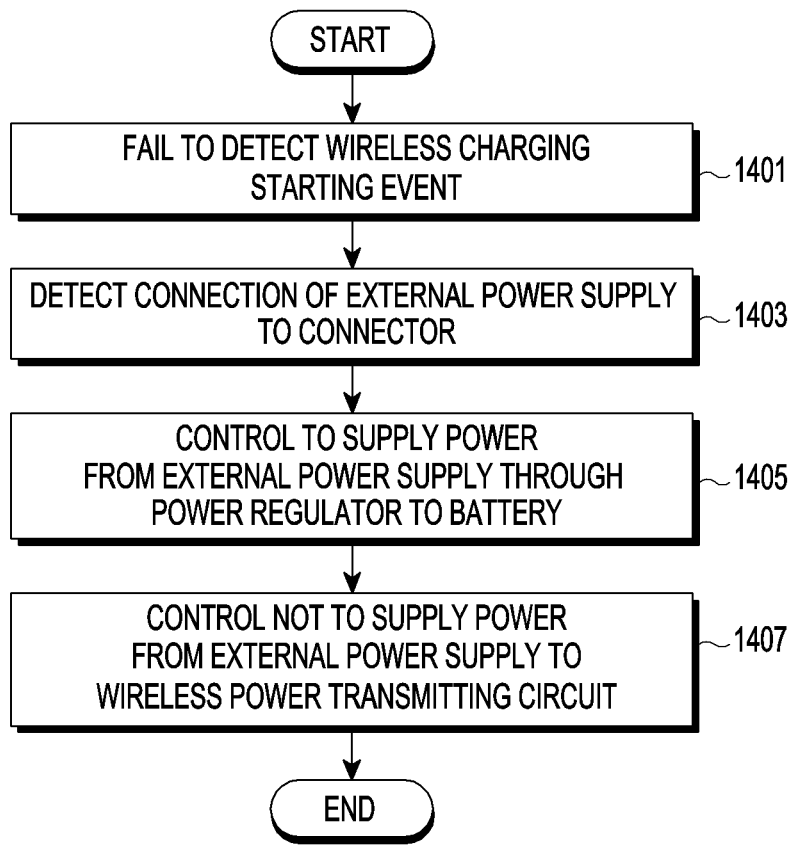
FIG. 14 is a flowchart illustrating a method for operating a battery pack, according to an embodiment.

FIG. 14 is a flowchart illustrating a method for operating a battery pack, according to an embodiment. The embodiment related to FIG. 14 is described in greater detail with reference to FIGS. 15A and 15B, which are views illustrating examples of switch connections in a battery pack, according to an embodiment.

Figure 15A:
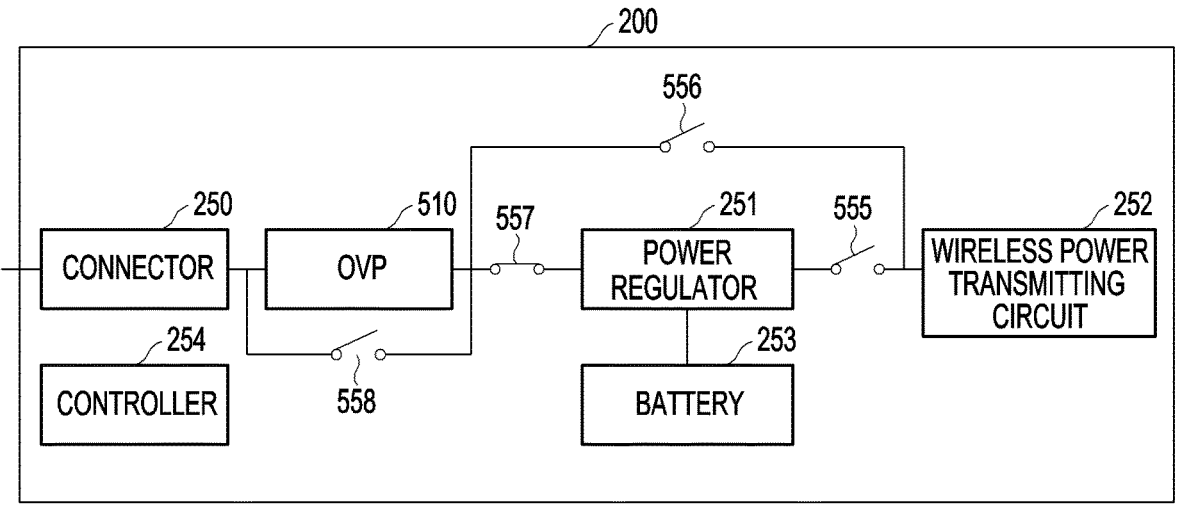
FIGS. 15A and 15B are views illustrating examples of switch connections in a battery pack, according to an embodiment.

Referring to FIG. 14, the battery pack 200 fails to detect a wireless charging initialization event in step 1401. For example, the battery pack 200 may fail to detect a coupling with the case 300 or a coupling with the electronic device 101. Despite detecting a coupling with the case 300 or with the electronic device 101, the battery pack 200 may fail to perform a procedure as defined by the wireless charging standards, thus the battery pack 200 may not perform a wireless charge. In step 1403, the battery pack 200 detects the connection of an external power supply to the connector 250. In step 1405, the battery pack 200 performs a control to supply power from the external power supply through the power regulator 251 to the battery 253. In step 1407, the battery pack 200 performs a control to not supply power from the external power supply to the wireless power transmitting circuit 252. For example, as shown in FIG. 15A, the battery pack 200 may control the first switch 555, control the second switch 556, and control the fourth switch 558 to turn off, and the battery pack 200 may control the third switch 557 to turn on. Accordingly, power from the external power supply may be delivered through the connector 250, through the OVP circuit 510, through the third switch 557, and through the power regulator 251 to the battery 253, and the battery 253 may perform a charge. As the second switch 556 is controlled to turn off, all power from the external power supply may be delivered to the battery 253.

Alternatively, the second switch 556 may be controlled to turn on. For example, upon detecting a separate key input, the controller 254 may transfer the wireless charging initialization signal to the wireless power transmitting circuit 252. Meanwhile, the controller 254 may abstain from transferring the signal to indicate that power from the battery is delivered to the wireless power transmitting circuit 252. The wireless power transmitting circuit 252 may be operated differently when it receives power from the battery 253. For example, the wireless power transmitting circuit 252 may wirelessly transmit a larger power magnitude when receiving power from the external power supply and performing a wireless charge compared to when receiving power from the battery 253 and performing a wireless charge. The wireless power transmitting circuit 252 may perform a procedure defined in the ping phase (e.g., sending out a ping signal), and upon detecting an electronic device requesting a wireless charge, the wireless power transmitting circuit 252 may perform a procedure as defined in the subsequent power transmit phase. When no electronic device requesting a wireless charge is detected, the controller 254 may deliver a deactivation signal to the wireless power transmitting circuit 252, and the wireless power transmitting circuit 252 may be deactivated.

Figure 15B:
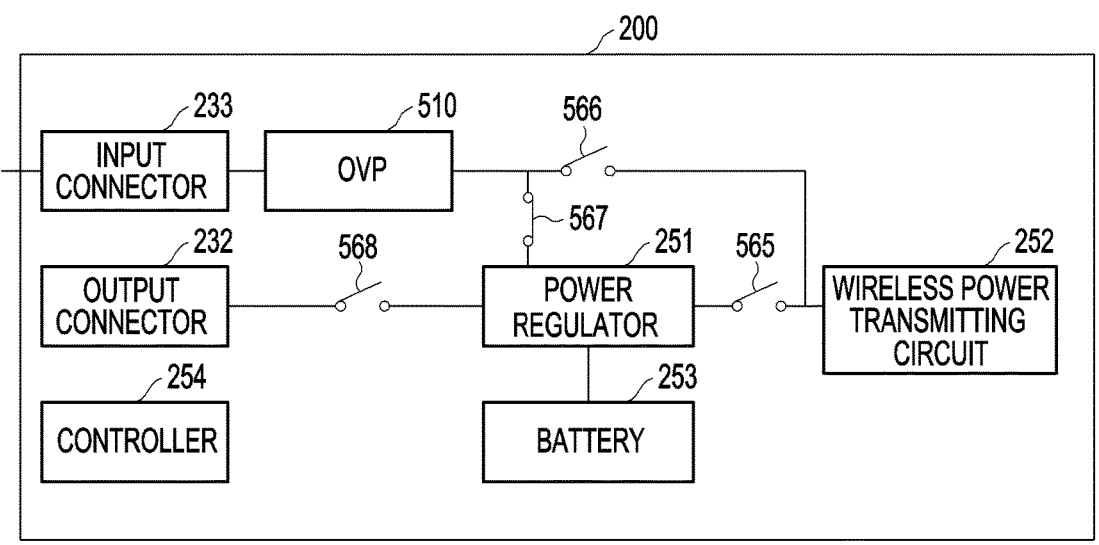

Referring to FIG. 15B, the battery pack 200 may fail to detect a wireless charging initialization event and may detect the connection between the external power supply and the input connector 233. The battery pack 200 may control the first switch 565, control the second switch 566, and control the fourth switch 568 to turn off, and the battery pack 200 may control the third switch 567 to turn on. Power from the external power supply may be delivered through the input connector 233, the OVP circuit 510, the third switch 567, and the power regulator 251 to the battery 253. The battery 253 may perform a charge using the power received via the input connector 233 and adjusted by the power regulator 251.

The battery pack 200 may detect the connection between the electronic device and the output connector 232. In this case, the battery pack 200 may control the first switch 565 and control the second switch 566 to turn off, and the battery pack 200 may control the third switch 567 and control the fourth switch 568 to turn on. Power from the external power supply may be delivered through the input connector 233 to the battery 253 and the output connector 232. Accordingly, the battery pack 200 may simultaneously perform the charging of the battery 253 and the wired charging of the external electronic device connected to the output connector 232, using the power from the external power supply.

Figure 16A:
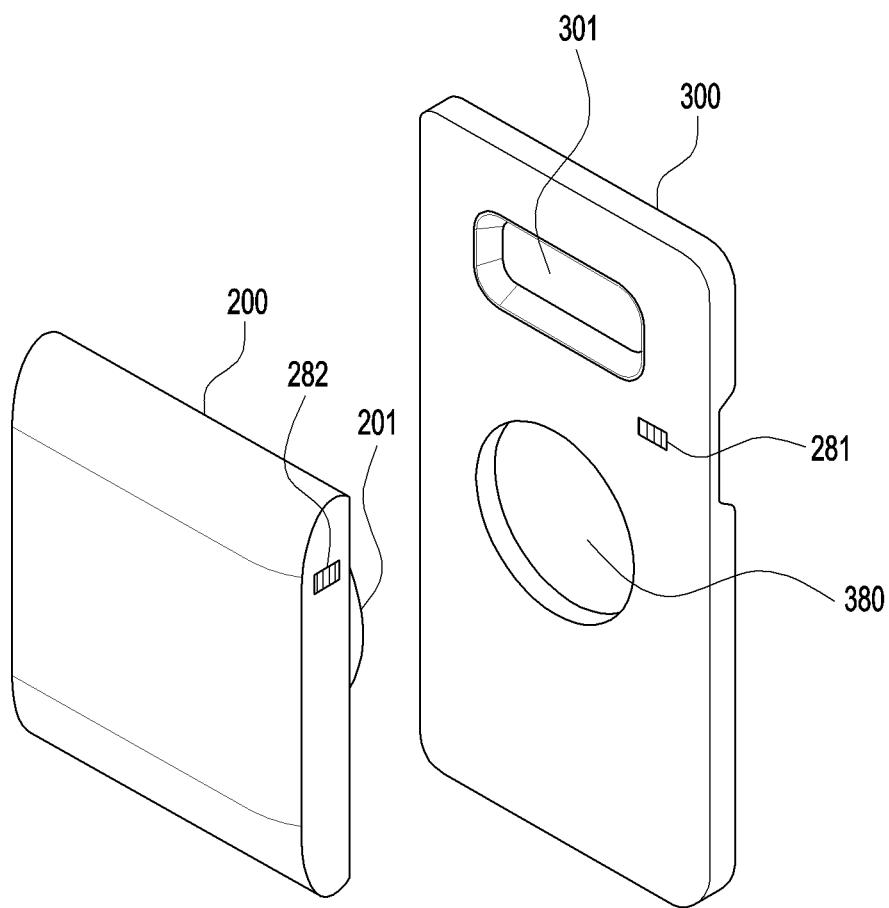
FIGS. 16A and 16B are views illustrating a state of a battery pack being coupled, according to an embodiment.
Figure 16B:
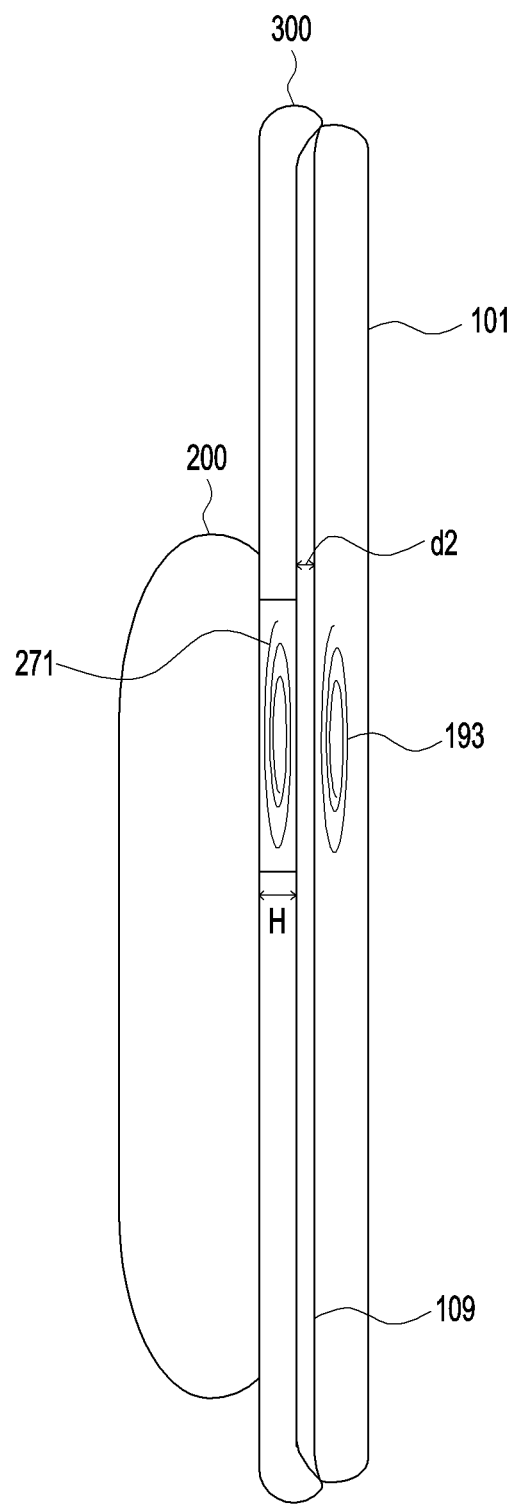

FIGS. 16A and 16B are views illustrating a state of a battery pack being coupled, according to an embodiment.

Referring to FIG. 16A, the case 300 may have an opening 301 and a second opening 380.

Referring to FIG. 16B, the coupling structure 201 of the battery pack 200 may be inserted into the second opening 380. One surface of the coupling structure 201 may contact, or not contact, the rear housing 109 of the electronic device 101. The coil 271 included in the coupling structure 201 may be spaced apart from the coil 193 of the electronic device 101 by the sum of the thickness d2 of the rear housing 109 and the distance between the coil 271 and one surface of the coupling structure 201. Accordingly, the coil 271 of the coupling structure 201 and the coil 193 of the electronic device 101 may be positioned close to each other, allowing for increased wireless charging efficiency. The battery pack 200 may include a coupling means 282 that may be coupled with the coupling means 381 of the case 300. For example, the coupling means 282 and the coupling means 381 may be magnets. The battery pack 200 and the case 300 may further include housing structures that may be fastened together.

Figure 17A:
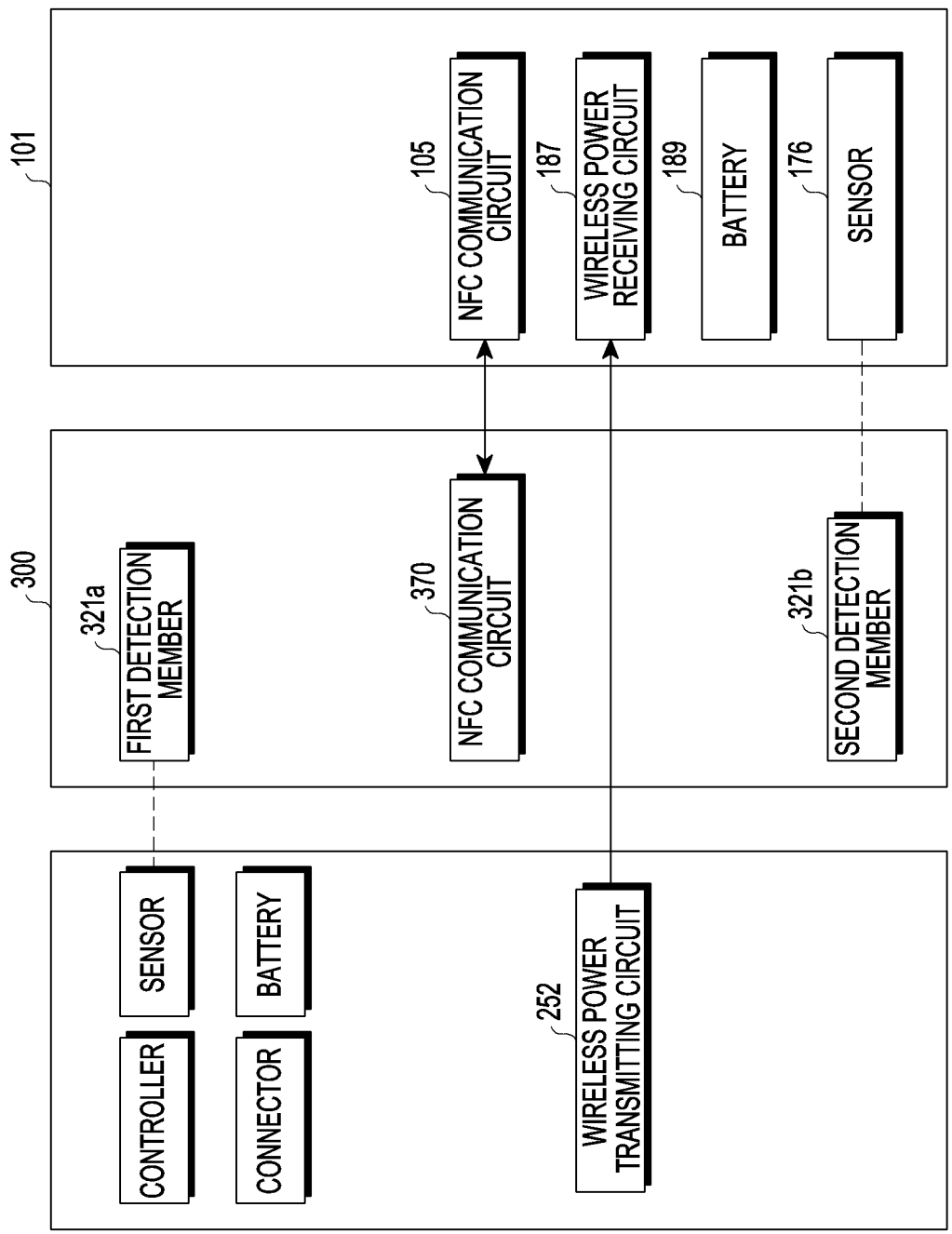
FIGS. 17A and 17B are views illustrating an electronic device, a battery pack, and a case, according to an embodiment.
Figure 17B:
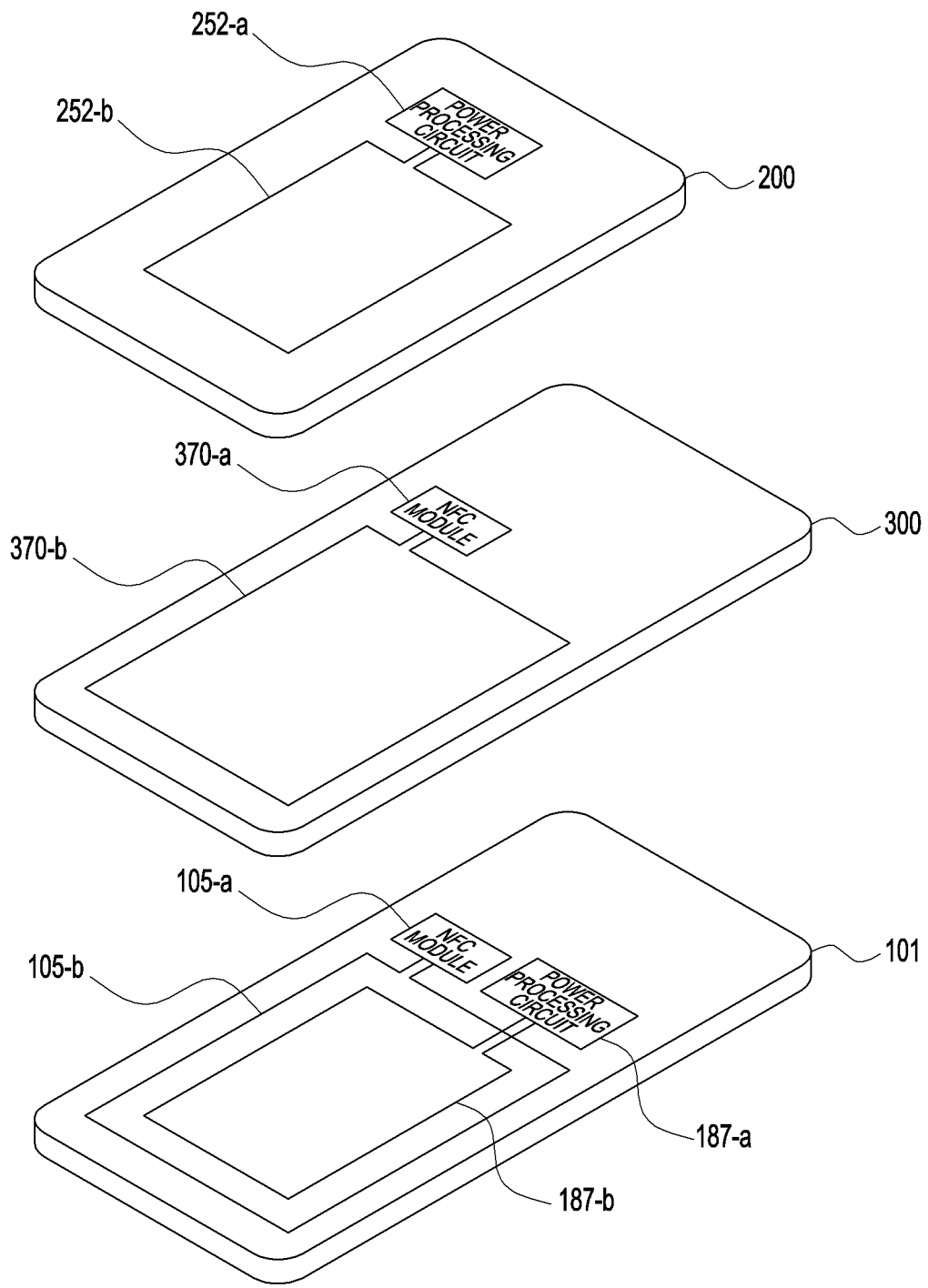

FIGS. 17A and 17B are views illustrating an electronic device, a battery pack, and a case, according to an embodiment.

Referring to FIG. 17A, the case 300 may include a first detection member 321a, a second detection member 321b, and an NFC circuit 370. The electronic device 101 may include an NFC circuit 105, a wireless power receiving circuit 187, a battery 189, and a sensor 176. The battery pack 200 may include a connector 250, a wireless power transmitting circuit 252, a battery 253, a controller 254, and a sensor 280. The sensor 280 of the battery pack 200 may sense the first detection member 321a. The controller 254, upon detecting the first detection member 321a, may determine that the battery pack 200 is mounted on the case 300. The sensor 176 of the electronic device 101 may sense the second detection member 321b of the case 300. The electronic device 101, upon detecting the second detection member 321b, may activate the NFC circuit 105 corresponding to the detection. The electronic device 101 may communicate with the NFC circuit 370 of the case 300 via the NFC circuit 105. For example, the NFC circuit may be operated in an NFC reader mode, and the NFC circuit 370 may be an NFC tag. The electronic device 101 may receive information about the case 300 via NFC. The electronic device 101 may determine whether or not the received information meets a designated condition, and upon determining that the received information meets the designated condition, the electronic device 101 may determine that the case 300 is a genuine one. Upon determining that the case 300 is a genuine one, the electronic device 101 may determine to perform a quick wireless charge. For example, upon determining that the case 300 is a genuine one and upon receiving a signal associated with initiating a wireless charge (e.g., a connection request corresponding to a Qi standard ping signal or an AFA standard advertisement signal), the electronic device 101 may determine to perform a quick wireless charge. The electronic device 101 may send a quick wireless charging request to the battery pack 200 via in-band communication or out-band communication. The wireless power receiving circuit 187 of the electronic device 101 may receive power that is wirelessly transmitted from the battery pack 200.

Referring to FIG. 17B, the battery pack 200 may include a power processing circuit 252-a and a coil 252-b. The case 300 may include an NFC module 370-a and an NFC antenna 370-b. The electronic device 101 may include an NFC module 105-a, an NFC antenna 105-b, a power processing circuit 187-a, and a coil 187-b. Although FIG. 17B illustrates an example in which the coil 252-b, the NFC antenna 370-b, the NFC module 105-a, or the NFC antenna 105-b is a single-turn winding coil, this is merely an example, and at least one of the coil 252-b, the NFC antenna 370-b, the NFC module 105-a, or the NFC antenna 105-b may be a multi-turn winding coil. The power processing circuit 252-a may process (e.g., at least one of DC-AC conversion or amplification) power from a power source (e.g., the battery 253 or an external power supply connected via the connector 250) and may provide the processed power to the coil 252-b. The coil 252-b may produce a magnetic field, the magnitude of which varies over time, using the received power. The coil 187-b of the electronic device 101 may produce an induced electromotive force from the magnetic field produced from the coil 252-b, thus allowing a current to flow to the power processing circuit 187-a. The power processing circuit 187-a may include a rectifying circuit for rectifying AC power and a DC/DC converting circuit for converting the voltage of the rectified power. The power processed by the power processing circuit 187-a may be transferred to the power management module 188 or battery 189 in the electronic device 101.

The NFC module 105-a may wirelessly transmit power for driving the NFC tag through the NFC antenna 105-b. For example, upon detecting that it is mounted on the case 300, the electronic device 101 may operate in NFC reader mode and thus may wirelessly transmit power for driving the NFC tag through the NFC antenna 105-b. The NFC antenna 370-b may receive the power which is wirelessly transmitted from the electronic device 101, and the NFC module 370-a may be driven using the wirelessly received power.

Although FIG. 17B illustrates that the case 300 includes a single NFC antenna 370-b, this is merely an example. The case 300 may include a first antenna for receiving power and a second antenna for transmitting information (e.g., authentication information) about the case 300. A power processing circuit including a rectifying circuit for rectifying the received power may be connected to the first antenna, and the NFC module 370-a may be driven using the power processed by the power processing circuit. The NFC module 370-a may transmit information (e.g., authentication information) about the case 300 through the NFC antenna 370-b. The NFC module 105-a may receive the case information through the NFC antenna 105-b. Upon determining that the received case information meets a designated condition, the electronic device 101 may determine that the case 300 is a genuine one. According to an embodiment, upon determining that the case 300 is a genuine one and upon receiving a signal associated with the initiation of wireless charging, the electronic device 101 may request the battery pack 200 to perform a quick wireless charge.

Figure 18:
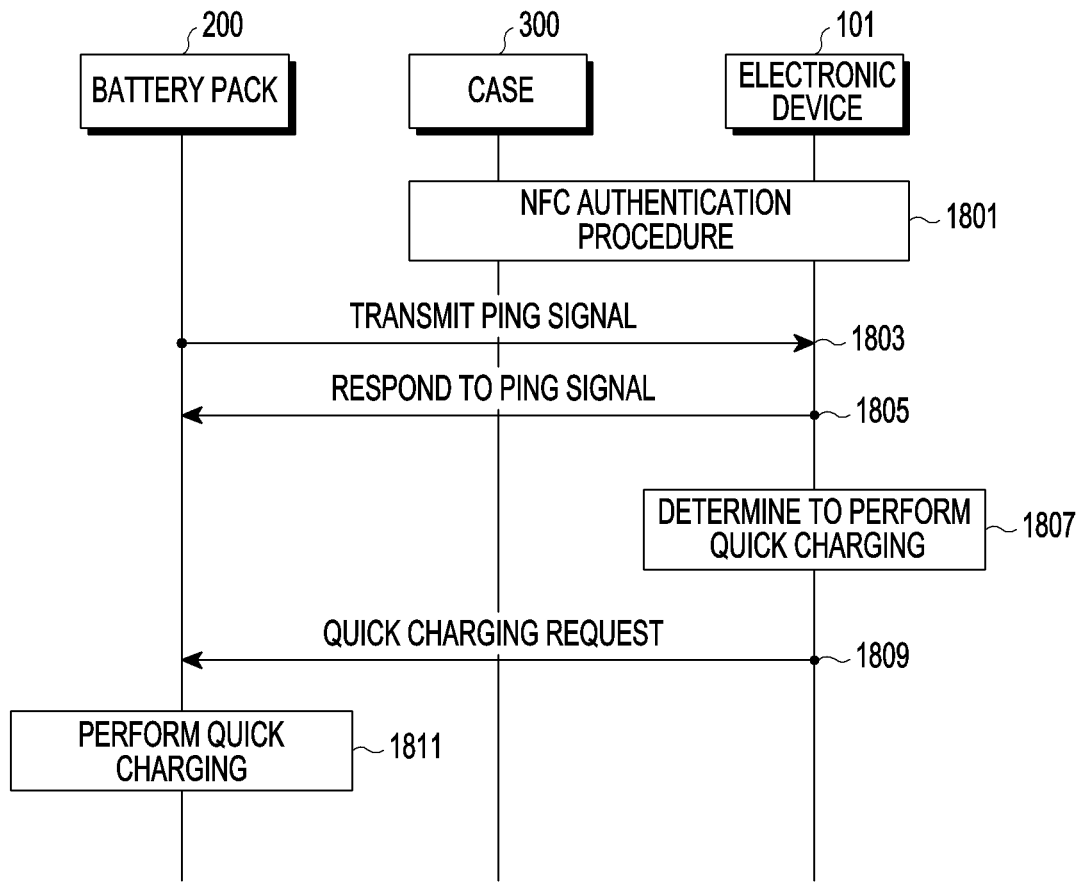
FIG. 18 is a flowchart illustrating operations of an electronic device, a battery pack, and a case, according to an embodiment.

FIG. 18 is a flowchart illustrating operations of an electronic device, a battery pack, and a case, according to an embodiment.

The electronic device 101 performs an NFC authentication procedure for the case 300 in step 1801. As set forth above, the electronic device 101 may operate in NFC reader mode and may perform the NFC authentication procedure by transmitting power for driving a circuit, by receiving information about the case 300, and by analyzing the received information. In step 1803, the battery pack 200 sends out a ping signal. In step 1805, the electronic device 101 responds to the ping signal. When the electronic device 101 follows the AFA standard, the electronic device 101 may send an advertisement signal to the battery pack 200 and, accordingly, receive a connection request. In step 1807, the electronic device 101 determines that it is to perform a quick charge. In step 1809, the electronic device 101 requests quick charging in a scheme defined in the wireless charging standards. In step 1811, the battery pack 200 performs a quick charge. For example, the battery pack 200 may perform a control to provide at least one of power from the external power supply or power from the internal battery to the wireless power transmitting circuit, depending on the power requested in quick charging mode.

Upon receiving a signal related to the initiation of wireless charging and failing NFC authentication, the electronic device 101 may request that the battery pack 200 perform a quick charge not in quick wireless charging mode but in normal wireless charging mode.

Upon identifying that connection to the case 300 and authentication has succeeded and the signal associated with the initiation of wireless charging has been or is being received, the electronic device 101 may send out a signal to request a quick charge. When the authentication of the case 300 is identified to fail, the electronic device 101 may wirelessly receive power not in quick charging mode but in normal charging mode.

Upon determining that the case 300 is mounted on the electronic device 101, the electronic device 101 may output a wireless charging-related signal through the wireless power receiving circuit. When no response is given to the output signal, the electronic device 101 may receive power from the battery pack 200 via the wireless power receiving circuit in a first wireless charging scheme (e.g., a normal charging scheme), thereby charging the battery. When a response is given to the output signal, the electronic device 101 may receive power from the battery pack 200 via the wireless power receiving circuit in a second wireless charging scheme (e.g., a quick charging scheme), thereby charging the battery.

Figure 19:
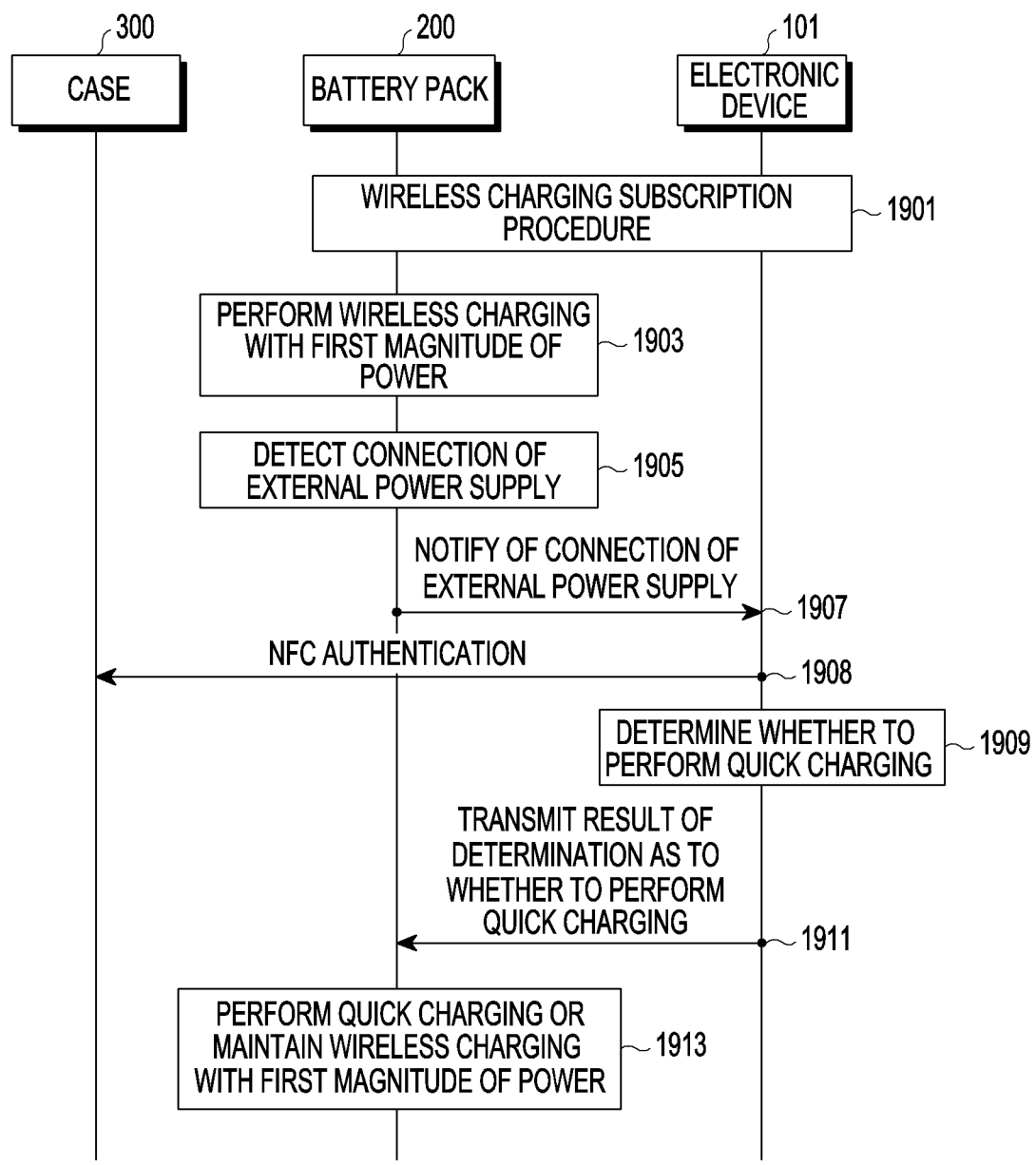
FIG. 19 is a flowchart illustrating operations of an electronic device, a battery pack, and a case, according to an embodiment.

FIG. 19 is a flowchart illustrating operations of an electronic device, a battery pack, and a case, according to an embodiment.

In step 1901, the electronic device 101 and the battery pack 200 perform a wireless charging subscription procedure. The wireless charging subscription procedure may include a ping-phase operation and an identification and configuration-phase operation, as per the Qi standard, and a power saving state operation and a low power state operation, as per the AFA standard. In step 1903, the battery pack 200 performs a wireless charge with a first power magnitude. In step 1905, the battery pack 200 detects the connection of an external power supply. For example, the battery pack 200 may determine whether the external power supply is connected based on, at least, the voltage magnitude applied to the connector 250. In step 1907, the battery pack 200 notifies the electronic device 101 of the connection of the external power supply. The battery pack 200 may notify the electronic device 101 that quick charging is available. In step 1908, the electronic device 101 performs an NFC authentication procedure on the case 300. Step 1908 may or may not be omitted. The NFC authentication procedure 1908 may be performed at any time before step 1907, and when the NFC authentication procedure is performed it may be performed at any time. In step 1909, the electronic device 101 determines whether to perform a quick charge. In step 1911, the electronic device 101 sends out a result of the determination in step 1909 as to whether or not to perform a quick charge. For example, the electronic device 101 may display a user interface for determining whether to perform a quick charge via the display device 160. The electronic device 101 may determine whether to perform a quick charge based on, at least, a command received through the user interface. In step 1913, the battery pack 200 performs a quick charge or maintains wireless charging with the first power magnitude. For example, when the electronic device 101 is not to perform a quick charge, the battery pack 200 may maintain wireless charging with the first power magnitude. In this case, the battery pack 200 may perform a control to prevent power from being provided from the battery 253 to the wireless power transmitting circuit 252 while allowing power to be provided from the external power supply to the wireless power transmitting circuit 252. When the electronic device 101 is allowed to perform a quick charge, the battery pack 200 may maintain wireless charging with a second power magnitude larger than the first power magnitude. In this case, the battery pack 200 may perform a control to keep providing power from the battery 253 to the wireless power transmitting circuit 252 while allowing power to be provided from the external power supply to the wireless power transmitting circuit 252. Alternatively, the battery pack 200 may perform a control to prevent power from being provided from the battery 253 to the wireless power transmitting circuit 252 while allowing power to be provided from the external power supply to the wireless power transmitting circuit 252. In this case, the battery pack 200 may charge the battery 253 with the power from the external power supply or may not perform a charge.

According to an embodiment, an electronic device may be comprised of a battery, a power regulator electrically connected with the battery and may include an input terminal and an output terminal, a connector electrically connected with the input terminal, a wireless power transmitting circuit electrically connected with the output terminal, a switch electrically connected between the connector and the wireless power transmitting circuit, and a controller configured to identify an approaching external electronic device or a wireless charging-related request, identify whether power from an external power supply is provided via the connector in response to the identification, when the power from the external power supply is not provided, supply power from the battery through the power regulator to the wireless power transmitting circuit, and when the power from the external power supply is provided, supply the power through the switch to the wireless power transmitting circuit.

According to an embodiment, the controller may be configured to, upon failing to identify the approaching external electronic device or the wireless charging-related request, supply the power from the external power supply to the battery.

According to an embodiment, the controller may be configured to, upon failing to identify the approaching external electronic device or the wireless charging-related request, restrict the supply of the power from the battery to the wireless power transmitting circuit.

According to an embodiment, the controller may be configured to, upon identifying the approaching external electronic device or the wireless charging-related request and upon providing the power from the external power supply, supply the power through the switch to the wireless power transmitting circuit while restricting the supply of the power to the battery.

According to an embodiment, the controller may be configured to, upon detecting a designated event to initiate designated first wireless charging, restrict the supply of power to the battery.

According to an embodiment, the controller may be configured to, upon identifying the approaching external electronic device or the wireless charging-related request, and upon providing the power from the external power supply, supply the power through the switch to the wireless power transmitting circuit while also supplying the power to the battery.

According to an embodiment, the controller may be configured to, upon failing to identify the approaching external electronic device or the wireless charging-related request, and upon detecting a connection to another connector of another external electronic device requesting a charge, supply the power from the battery through the connector to the other external electronic device.

According to an embodiment, the controller may be configured to, upon failing to identify the approaching external electronic device or the wireless charging-related request, and upon detecting a connection to another connector of another external electronic device requesting charging, restrict the supply of power from the battery to the wireless power transmitting circuit.

According to an embodiment, the external electronic device may include at least one of an electronic device that includes a wireless power receiving circuit or a case configured to receive the electronic device that includes the wireless power receiving circuit.

According to an embodiment, the electronic device may additionally include a sensor configured to sense a mounting detection member included in the external electronic device, wherein the controller may be configured to identify the approaching external electronic device based on, at least, sensing information from the sensor.

According to an embodiment, the controller may be configured to identify a voltage applied to the connector and determine whether the external power supply is connected based on, at least, the result of the identification.

According to an embodiment, the electronic device may further be comprised of a housing that includes a first surface and a second surface that faces the first surface. In this case, at least one of the battery, the power regulator, the wireless power transmitting circuit, the connector, or the switch may be positioned between the first surface and the second surface. The housing may include a coupling structure projecting from the first surface. A coil of the wireless power transmitting circuit may be positioned inside the coupling structure.

According to an embodiment, an electronic device may be comprised of a battery, a power regulator electrically connected with the battery and may include an input terminal and an output terminal, a connector, a wireless power transmitting circuit, a first switch configured to selectively and electrically connect an output terminal of the power regulator with the wireless power transmitting circuit, a second switch configured to selectively and electrically connect the wireless power transmitting circuit with the connector, and a controller configured to determine whether a wireless charging initialization event is detected, identify whether an external power supply is connected and control an on/off state of each of the first switch and the second switch based on whether the wireless charging initialization event is detected and whether the external power supply is connected.

According to an embodiment, the controller may be configured to, upon determining that the wireless charging initialization event is detected and that the external power supply is connected, control the first switch to turn off and the second switch to turn on.

According to an embodiment, the electronic device may further be comprised of a third switch configured to selectively and electrically connect the connector with an input terminal of the power regulator, wherein the controller may be configured to, upon detecting a first event, control the third switch to turn on, and upon detecting a second event different from the first event, control the third switch to turn off.

According to an embodiment, the controller may be configured to, upon determining that the wireless charging initialization event is detected and that the external power supply is not connected, control the first switch to turn on.

According to an embodiment, the controller may be configured to, upon determining that the wireless charging initialization event is not detected and that the external power supply is connected, control the first switch to turn off.

According to an embodiment, the electronic device may further be comprised of a third switch configured to selectively and electrically connect the connector with an input terminal of the power regulator, wherein the controller may be configured to, upon determining that the wireless charging initialization event is not detected and that the external power supply is connected, control the third switch to turn on.

According to an embodiment, the controller may be configured to, upon determining that the wireless charging initialization event is not detected and that the external power supply is not connected, control the first switch to turn off.

According to an embodiment, the electronic device may further be comprised of a third switch configured to selectively and electrically connect the connector with an input terminal of the power regulator, wherein the controller may be configured to, upon determining that the wireless charging initialization event is not detected and that another external electronic device requesting a wired charge is connected to the connector, control the third switch to turn on.

According to an embodiment, an electronic device may be comprised of a short-range communication circuit, a wireless power receiving circuit, a battery, and a processor electrically connected with the short-range communication circuit and the wireless power receiving circuit. The processor may be configured to identify, through the short-range communication circuit, whether a case including a coupling unit physically capable of being coupled with an external battery pack is mounted on the electronic device, when the case is mounted on the electronic device, to output a wireless charging-related signal through the wireless power receiving circuit and monitor for a response to the signal, when there is no response to the signal, to receive power from the external battery pack via the wireless power receiving circuit in a first wireless charging scheme and charge the battery, and when there is a response to the signal, to receive the power from the external battery pack via the wireless power receiving circuit in a second wireless charging scheme and charge the battery.

According to an embodiment, an electronic device may be comprised of an NFC circuit, a processor electrically connected with the NFC circuit, and a wireless power receiving circuit, wherein the processor may be configured to receive information from a case containing the electronic device through the NFC circuit and, when the received information meets a designated condition, determine that authentication of the case is successful, when the authentication of the case is successful and upon receiving a signal associated with initiating wireless charging from a battery pack coupled with the case through the wireless power receiving circuit, determine to perform a quick wireless charge, and in response to determining to perform the quick wireless charge, send a quick wireless charging request through the wireless power receiving circuit to the battery pack.

Various embodiments as set forth herein may be implemented as software (e.g., the program 140) containing commands that are stored in a machine (e.g., a computer)-readable storage medium (e.g., an internal memory 136) or an external memory 138. The machine may be a device that may invoke an instruction stored in the storage medium and may be operated as per the invoked instruction. The machine may include an electronic device (e.g., the electronic device 101) according to embodiments disclosed herein. When the instruction is executed by a processor (e.g., the processor 120), the processor may perform a function corresponding to the instruction on its own or using other components under the control of the processor. The instruction may contain a code that is generated or executed by a compiler or an interpreter.

The machine-readable storage medium may be provided in the form of a non-transitory storage medium. The term "non-transitory" means that the storage medium does not include a signal and is tangible, but this expression does not differentiate between where data is semipermanently stored in the storage medium and where data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, a battery pack and operation method are provided that may control the on/off state of various inner switches under a diversity of conditions, such as whether the battery pack connects to an electronic device or an external electronic device (e.g., a casing or a connection of the connector). Accordingly, the battery pack and operation method may adjust the power supplying route in various ways. The battery pack may adjust the power supplying route inside the battery depending on various conditions (e.g., when power is fed to the outside or when the inner battery is charged). Thus, the battery pack may be efficiently managed for each condition.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a battery;
   a power regulator electrically connected with the battery and including an input terminal and an output terminal;
   a connector electrically connected with the input terminal;
   a wireless power transmitting circuit electrically connected with the output terminal;
   a first switch electrically connected between the connector and the wireless power transmitting circuit;
   a second switch electrically connected between the connector and the battery; and
   a controller configured to:
   identify an approach of an external electronic device or a request related to wireless charging,
   in response to identifying the approach of the external electronic device or the request related to the wireless charging, identify whether first power is provided from an external power supply via the connector,
   in response to identifying that the first power is not provided from the external power supply, supply second power from the battery via the power regulator to the wireless power transmitting circuit, and
   in response to identifying that the first power is provided from the external power supply, control supplying of the first power provided from the external power supply to at least one of the battery or the wireless power transmitting circuit by controlling a state of the second switch,
   wherein, based on the state of the second switch being a first state, a first part of the first power is supplied to the battery and a second part of the first power is supplied to the wireless power transmitting circuit, and
   wherein, based on the state of the second switch being a second state, the first power is supplied to the wireless power transmitting circuit while supplying of the first power to the battery is restricted.

2. The electronic device of claim 1, wherein the controller is further configured to, in response to failing to identify the approach of the external electronic device or the wireless charging-related request, supply the power from the external power supply to the battery.

3. The electronic device of claim 2, wherein the controller is further configured to, in response to failing to identify the approach of the external electronic device or the wireless charging-related request, restrict supplying of the second power from the battery to the wireless power transmitting circuit.

4. The electronic device of claim 1, wherein the controller is further configured to, in response to identifying the approach of the external electronic device or the wireless charging-related request and identify that the first power is provided from the external power supply, supply the first power through the first switch to the wireless power transmitting circuit while restricting the supplying of the first power provided from the external power supply to the battery.

5. The electronic device of claim 4, wherein the controller is further configured to, in response to detecting a designated event to initiate designated first wireless charging, restrict the supplying of the first power to the battery.

6. The electronic device of claim 1, wherein the controller is further configured to, in response to identifying the approach of the external electronic device or the wireless charging-related request and identifying that the first power is provided from the external power supply, supply the second part of the first power via the first switch to the wireless power transmitting circuit while supplying the first part of the first power to the battery.

7. The electronic device of claim 1, wherein the controller is further configured to, in response to failing to identify the approach of the external electronic device or the wireless charging-related request and detecting a connection to another connector of another external electronic device requesting charging, supply the second power from the battery via the other connector to the other external electronic device.

8. The electronic device of claim 6, wherein the controller is further configured to, in response to failing to identify the approach of the external electronic device or the wireless charging-related request and detecting a connection to another connector of the other external electronic device requesting the charging, restrict the supplying of the second power from the battery to the wireless power transmitting circuit.

9. The electronic device of claim 1, wherein the external electronic device includes at least one of a wireless power receiving circuit or a case configured to contain the wireless power receiving circuit.

10. The electronic device of claim 1, further comprising a sensor configured to sense a mounting detection member included in the external electronic device, wherein the controller is further configured to identify the approach of the external electronic device based on, at least, sensing information from the sensor.

11. The electronic device of claim 1, wherein the controller is further configured to identify a voltage applied to the connector and determine whether the external power supply is connected based on, at least, a result of the identification of the voltage applied to the connector.

12. The electronic device of claim 1, further comprising a housing including a first surface and a second surface facing the first surface,
wherein at least one of the battery, the power regulator, the wireless power transmitting circuit, the connector, or the first switch is positioned between the first surface and the second surface,
wherein the housing includes a coupling structure projecting from the first surface, and
wherein a coil of the wireless power transmitting circuit is positioned inside the coupling structure.

13. An electronic device, comprising:
a battery;
a power regulator electrically connected to the battery and including an input terminal and an output terminal;
a connector;
a wireless power transmitting circuit;
a first switch configured to selectively and electrically connect an output terminal of the power regulator to the wireless power transmitting circuit;
a second switch configured to selectively and electrically connect the wireless power transmitting circuit to the connector;
a third switch configured to selectively and electrically connect the connector to the battery; and
a controller configured to:
identify whether a wireless charging initialization event is detected,
identify whether an external power supply is connected,
control an on/off state of each of the first switch and the second switch based on whether the wireless charging initialization event is detected and whether the external power supply is connected, and
control supplying of power provided from the external power supply to at least one of the battery or the wireless power transmitting circuit by controlling a state of the third switch,
wherein, based on the state of the third switch being a first state, a first part of the power is supplied to the battery and a second part of the power is supplied to the wireless power transmitting circuit, and
wherein, based on the state of the third switch being a second state, the power is supplied to the wireless power transmitting circuit while supplying of the power to the battery is restricted.

14. The electronic device of claim 13, wherein the controller is further configured to, in response to identifying that the wireless charging initialization event is detected and that the external power supply is connected, control the first switch to turn off and the second switch to turn on.

15. The electronic device of claim 14, wherein the third switch is further configured to selectively and electrically connect the connector to an input terminal of the power regulator, and
wherein the controller is further configured to:
in response to detecting a first event, control the third switch to turn on, and
in response to detecting a second event different from the first event, control the third switch to turn off.

16. The electronic device of claim 13, wherein the controller is further configured to, in response to identifying that the wireless charging initialization event is detected and that the external power supply is not connected, control the first switch to turn on.

17. The electronic device of claim 13, wherein the controller is further configured to, in response to identifying that the wireless charging initialization event is not detected and that the external power supply is connected, control the first switch to turn off.

18. An electronic device, comprising:
a short-range communication circuit;
a wireless power receiving circuit;
a battery; and
a processor electrically connected to the short-range communication circuit and the wireless power receiving circuit, the processor configured to:
  identify, through the short-range communication circuit, whether a case including a coupling unit physically capable of being coupled with an external battery pack is mounted on the electronic device,
  in response to the case being mounted on the electronic device, output a wireless charging-related signal through the wireless power receiving circuit and monitor for a response to the wireless charging-related signal,
  in response to there being no response to the wireless charging-related signal, receive power from the external battery pack via the wireless power receiving circuit in a first wireless charging scheme and charge the battery, and
  in response to the wireless charging-related signal, receive the power from the external battery pack via the wireless power receiving circuit in a second wireless charging scheme and charge the battery.

19. The electronic device of claim 18, wherein the processor is further configured to, when authentication of the case succeeds, send a request for transmitting the power in the second wireless charging scheme through the wireless power receiving circuit.

* * * * *